US012804256B2

(12) United States Patent
Park et al.

(10) Patent No.: US 12,804,256 B2
(45) Date of Patent: Nov. 17, 2026

(54) ELECTRONIC DEVICE ACQUIRING A FIRST IMAGE CORRESPONDING TO A FIRST RESOLUTION BASED ON A RESULT OF RAW IMAGE DATA INPUT TO A MACHINE LEARNING MODEL, AND ACQUIRING A SECOND IMAGE CORRESPONDING TO A SECOND RESOLUTION LOWER THAN THE FIRST RESOLUTION, AND OPERATING METHOD THEREOF

(71) Applicant: SAMSUNG ELECTRONICS CO., LTD., Suwon-si (KR)

(72) Inventors: Jaehyoung Park, Suwon-si (KR); Dongsoo Kim, Suwon-si (KR); Kawang Kang, Suwon-si (KR); Yunjeong Kim, Suwon-si (KR); Inah Moon, Suwon-si (KR); Byeongjoo Song, Suwon-si (KR); Shuichi Shimokawa, Suwon-si (KR); Yeotak Youn, Suwon-si (KR); Hyeoncheol Jo, Suwon-si (KR); Youngbae Son, Suwon-si (KR); Jonghoon Won, Suwon-si (KR); Suhyog Kwon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/444,323

(22) Filed: Feb. 16, 2024

(65) Prior Publication Data

US 2024/0259680 A1 Aug. 1, 2024

Related U.S. Application Data

(63) Continuation of application No. PCT/KR2024/000890, filed on Jan. 18, 2024.

(30) Foreign Application Priority Data

Jan. 31, 2023 (KR) ........................ 10-2023-0013150
Mar. 16, 2023 (KR) ........................ 10-2023-0034783

(51) Int. Cl.
*H04N 5/335* (2011.01)
*G06T 3/4015* (2024.01)
(Continued)

(52) U.S. Cl.
CPC ......... *H04N 23/667* (2023.01); *G06T 3/4015* (2013.01); *G06T 3/4038* (2013.01); *H04N 23/55* (2023.01); *H04N 25/46* (2023.01)

(58) Field of Classification Search
CPC ..................................................... H04N 25/46
See application file for complete search history.

(56) References Cited

U.S. PATENT DOCUMENTS 10,764,507 B1 9/2020 Li et al.
10,848,730 B2 11/2020 Buettner
(Continued)

FOREIGN PATENT DOCUMENTS

CN 111835944 A 10/2020
CN 114745502 A 7/2022
(Continued)

OTHER PUBLICATIONS

International Search Report (PCT/ISA/210) issued May 1, 2024 by the International Searching Authority in International Patent Application No. PCT/KR2024/000890.
(Continued)

*Primary Examiner* — Gary C Vieaux
(74) *Attorney, Agent, or Firm* — Sughrue Mion, PLLC

(57) ABSTRACT

An electronic device is configured to determine a mode corresponding to a first resolution of an image; output a first
(Continued)

raw image data corresponding to a first data read out from the first photo diode; acquire a first image corresponding to the first resolution, based on a result of inputting the first raw image data to a machine learning model; output a second raw image data acquired by performing an image processing operation about a second data which is read out from the set of second photo diodes, based on the determined mode corresponding to a second resolution which is lower than the first resolution; and acquire a second image corresponding to the second resolution by performing a second image signal processing of the second raw image data.

20 Claims, 14 Drawing Sheets

(51) Int. Cl.

| | |
|---|---|
| ***G06T 3/4038*** | (2024.01) |
| ***H04N 23/55*** | (2023.01) |
| ***H04N 23/667*** | (2023.01) |
| ***H04N 25/46*** | (2023.01) |

(56) References Cited

U.S. PATENT DOCUMENTS

| | | | |
|---|---|---|---|
| 10,924,656 | B2 | 2/2021 | Kim et al. |
| 11,451,734 | B2 | 9/2022 | Kim |
| 11,582,430 | B2 | 2/2023 | Kim et al. |
| 11,849,226 | B2 | 12/2023 | Kim et al. |
| 11,863,884 | B2 * | 1/2024 | Galor Gluskin ........ G06K 19/06037 |
| 12,279,043 | B2 | 4/2025 | Yang |
| 2007/0165140 | A1 | 7/2007 | Kondo |
| 2008/0122946 | A1 | 5/2008 | Sung et al. |
| 2018/0367775 | A1 * | 12/2018 | Buettner ........ H04N 9/646 |
| 2021/0006755 | A1 | 1/2021 | Kim et al. |
| 2022/0086381 | A1 | 3/2022 | Moon et al. |
| 2022/0094842 | A1 | 3/2022 | Fujiwara |
| 2022/0210378 | A1 | 6/2022 | Tseng et al. |
| 2025/0194271 | A1 * | 6/2025 | Suess ........ H10F 39/182 |

FOREIGN PATENT DOCUMENTS

| | | | |
|---|---|---|---|
| JP | 4517301 | B2 | 8/2010 |
| JP | 2019-12998 | A | 1/2019 |
| JP | 2020-113809 | A | 7/2020 |
| KR | 10-0781552 | B1 | 11/2007 |
| KR | 10-2018-0043591 | A | 4/2018 |
| KR | 10-2021-0004229 | A | 1/2021 |
| KR | 10-2021-0047483 | A | 4/2021 |
| KR | 10-2021-0087809 | A | 7/2021 |
| KR | 10-2022-0038638 | A | 3/2022 |
| KR | 10-2022-0137459 | A | 10/2022 |

OTHER PUBLICATIONS

Written Opinion (PCT/ISA/237) issued May 1, 2024 by the International Searching Authority in International Patent Application No. PCT/KR2024/000890.

Extended European Search Report dated Mar. 4, 2026, issued by the European Patent Office in European Application No. 24750462.4.

Extended European Search Report dated Aug. 5, 2026, issued by the European Patent Office in European Application No. 26188844.0.

* cited by examiner

ELECTRONIC DEVICE ACQUIRING A FIRST IMAGE CORRESPONDING TO A FIRST RESOLUTION BASED ON A RESULT OF RAW IMAGE DATA INPUT TO A MACHINE LEARNING MODEL, AND ACQUIRING A SECOND IMAGE CORRESPONDING TO A SECOND RESOLUTION LOWER THAN THE FIRST RESOLUTION, AND OPERATING METHOD THEREOF

CROSS-REFERENCE TO RELATED APPLICATIONS

This application is a by-pass continuation application of International Application No. PCT/KR2024/000890, filed on Jan. 18, 2024, which is based on and claims priority to Korean Patent Application Nos. 10-2023-0013150, filed on Jan. 31, 2023, and 10-2023-0034783, filed on Mar. 16, 2023, in the Korean Intellectual Property Office, the disclosures of which are incorporated by reference herein their entireties.

BACKGROUND

1. Field

The disclosure relates to an electronic device which acquires an image through an image sensor, and an operating method of the electronic device.

2. Description of Related Art

An electronic device may acquire image data from an output of an image sensor which transforms an optical signal into an electrical signal. The image sensor may include a color filter and a light receiving element (e.g., a photo diode, a pinned-photodiode, a phototransistor, a photogate). The light receiving element may receive light passing through the color filter corresponding to a specific color, and may output an electric signal corresponding to the received light. The electronic device may acquire image data including a set of pixel values which are determined based on a value outputted from the image sensor. Image quality of image data may depend on the number of pixels included in the image data, and apparatuses and methods for acquiring image data having a larger number of pixels to acquire image data of higher image quality are developing.

Since a light receiving element receives light passing through a color filter of a specific color, information detected through one light receiving element may correspond to one color. A color filter performs a role of enabling a finally acquired image to express a color, but may cause the finally acquired image to be expressed at lower resolutions than the total number of light receiving elements disposed in the image sensor. Color reproduction and a resolution may be in a trade-off relationship conflicting each other. A Bayer pattern has been widely used as a pattern for exactly reproducing a color while reducing degradation of resolutions.

The above-described information is provided as a related-art technology for the purpose of easy understanding of the disclosure. Any assertion or decision is not presented as to what content of the above-described contents to apply as prior art in relation to the disclosure.

SUMMARY

According to an aspect of the disclosure, an electronic device may include: a camera comprising a lens and an image sensor configured to convert an optical signal passing through the lens into a digital signal; a memory configured to store instructions; and at least one processor, wherein the image sensor comprises: a plurality of micro lenses including a first micro lens, a plurality of light receiving elements corresponding to a plurality of photo diodes arranged in a M×N configuration corresponding to the first micro lens, at least one of M or N being a natural number greater than or equal to 2, wherein the plurality of photo diodes includes a first photo diode and a set of second photo diodes, and a color filter comprising a plurality of color channels, and wherein the instructions, being executed by the at least one processor, cause the electronic device to: determine a shooting mode corresponding to a first resolution of an image to be shot by using the camera; output, by controlling the image sensor, a first raw image data corresponding to a first data which is read out from the first photo diode, wherein an output of the first photo diode corresponds to one pixel, based on the determined shooting mode corresponding to the first resolution; acquire a first image corresponding to the first resolution, based on a result of inputting the first raw image data to a machine learning model; output, by controlling the image sensor, a second raw image data acquired by performing at least one image processing operation with respect to a second data which is read out from the set of second photo diodes, wherein outputs of the set of second photo diodes correspond to one pixel, based on the determined shooting mode corresponding to a second resolution which is lower than the first resolution; and acquire a second image corresponding to the second resolution by performing a second image signal processing of the second raw image data.

According to an aspect of the disclosure, a method performed by an electronic device comprising a camera comprising an image sensor, wherein the image sensor may comprises a plurality of photo diodes arranged in a M×N configuration corresponding to one first micro lens, at least one of M or N being a natural number greater than or equal to 2, the method comprising: determining a shooting mode corresponding to a resolution of an image to be shot by using the camera; outputting, by controlling the image sensor, first raw image data corresponding to first data which is read out from a first photo diode of the plurality of photo diodes, wherein an output of the first photo diode corresponds to one pixel, based on the determined shooting mode corresponding to a first resolution; acquiring a first image corresponding to the first resolution, based on a result of inputting the first raw image data to a machine learning; outputting second raw image data acquired by performing at least one image processing operation with respect to second data which is read out from a set of second photo diodes of the plurality of photo diodes, wherein outputs of the set of second photo diodes corresponds to one pixel, based on the determined shooting mode corresponding to a second resolution which is lower than the first resolution; and acquiring a second image corresponding to the second resolution by performing a second image signal processing with respect to the second raw image data.

According to an aspect of the disclosure, an image sensor may include: a plurality of light receiving elements; a plurality of micro lenses comprising a first micro lens; and a color filter comprising a plurality of color channels, wherein the plurality of light receiving elements correspond to a plurality of photo diodes arranged in a M×N configuration corresponding to the first micro lens, at least one of M or N being a natural number greater than or equal to 2, wherein the image sensor is configured to: based on a first shooting mode corresponding to a first resolution, output first raw image data corresponding to first data which is read out from a first photo diode of the plurality of photo diodes, wherein an output of the first photo diode corresponds to one pixel; and based on a second shooting mode corresponding to a second resolution which is lower than the first resolution, output second raw image data acquired by performing at least one image processing operation with respect to second data which is read out from a set of second photo diodes of the plurality of photo diodes, wherein outputs of the set of second photo diodes correspond to one pixel.

According to an aspect of the disclosure, a computer-readable non-transitory recording medium may store a computer program, being executed by at least one processor, which cause an electronic device or an image sensor to perform the above-described operation.

According to an aspect of the disclosure, a computer-readable non-transitory recording medium may store a computer program recorded thereon to perform the above-described method when an electronic device executes the method.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

In the disclosure, the term 'pixel' refers to a minimum unit constituting a digital image. A resolution of an image may be represented by the number of pixels included in the image. For example, when an image is constituted by a×b pixels which are arranged in a rows and b columns, a resolution of the image may be indicated by a×b.

Figure 1:
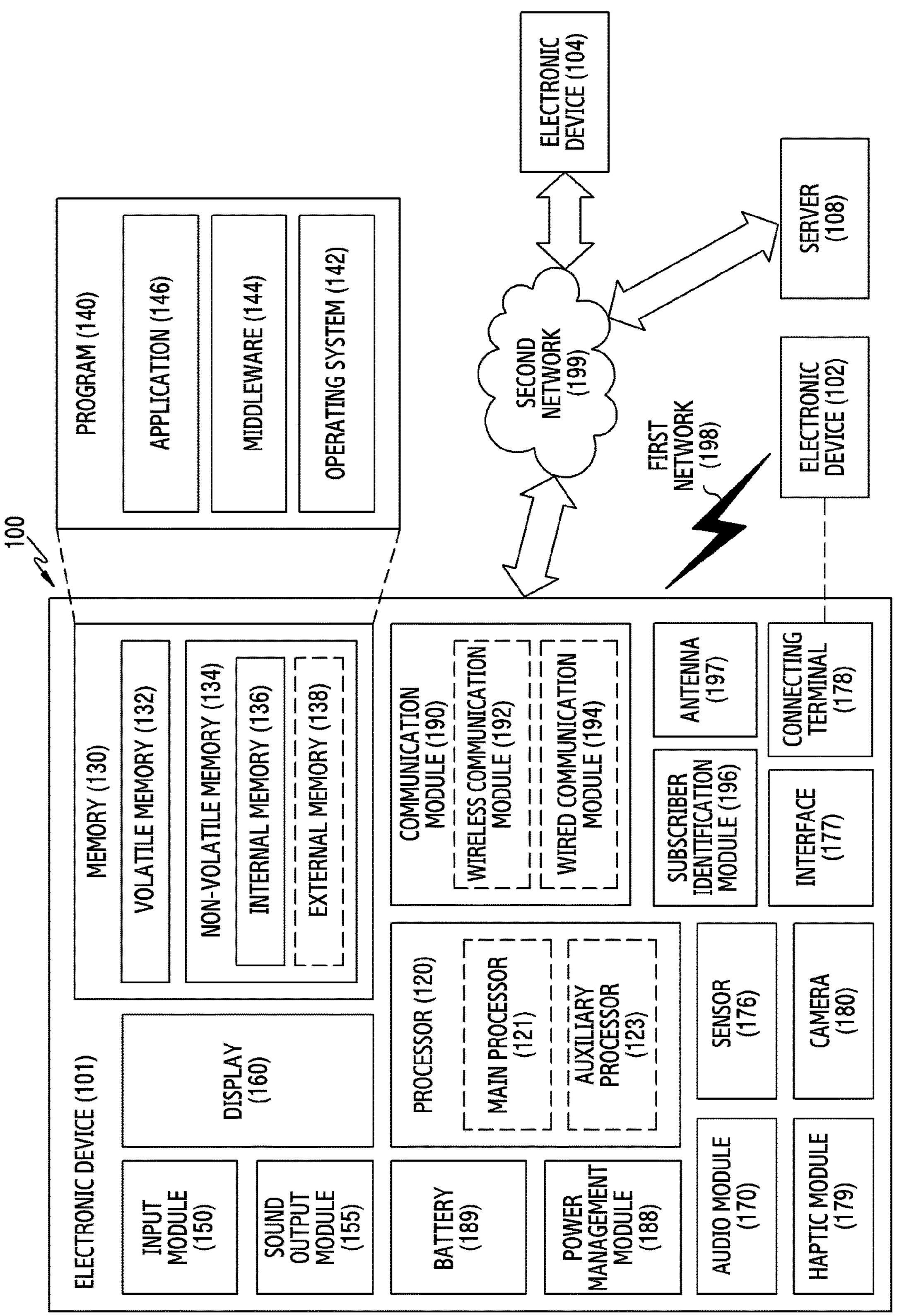
FIG. 1 illustrates an electronic device in a network environment according to various embodiment.

FIG. 1 is a block diagram illustrating an electronic device 101 in a network environment 100 according to one or more embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display 160, an audio module 170, a sensor 176, an interface 177, a connecting terminal 178, a haptic module 179, a camera 180, a power management module 188, a battery 189, a communication module 190, a subscriber identification module (SIM) 196, or an antenna 197. In some embodiments, at least one of the components (e.g., the connecting terminal 178) may be omitted from the electronic device 101, or one or more other components may be added in the electronic device 101. In some embodiments, some of the components (e.g., the sensor 176, the camera 180, or the antenna 197) may be implemented as a single component (e.g., the display 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least a part of the data processing or computation, the processor 120 may store a command or data received from another component (e.g., the sensor 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display 160, the sensor 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera 180 or the communication module 190) functionally related to the auxiliary processor 123. According to an embodiment, the auxiliary processor 123 (e.g., the neural processing unit)

may include a hardware structure specified for artificial intelligence model processing. An artificial intelligence model may be generated by machine learning. In some embodiments, the artificial intelligence model may be referred to as a machine learning model. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor 176) of the electronic device 101. The various data may include, for example, software (e.g., the program 140) and input data or output data for a command related to the software. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera 180 may capture a still image or moving images. According to an embodiment, the camera 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna 197 may transmit or receive a signal or power to or from the outside (e.g., the external electronic device) of the electronic device 101. According to an embodiment, the antenna 197 may include an antenna including a radiating element composed of a conductive material or a conductive pattern formed in or on a substrate (e.g., a printed circuit board (PCB)). According to an embodiment, the antenna 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna 197.

According to one or more embodiments, the antenna 197 may form an mmWave antenna. According to an embodiment, the mmWave antenna may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to one or more embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

One or more embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with one or more embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

One or more embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to one or more embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one or more embodiments, each component (e.g., a module or a program) of the above-described components may include a single entity or multiple entities, and some of the multiple entities may be separately disposed in different components. According to one or more embodiments, one or more of the above-described components may be omitted, or one or more other components may be added. Alternatively or additionally, a plurality of components (e.g., modules or programs) may be integrated into a single component. In such a case, according to one or more embodiments, the integrated component may still perform one or more functions of each of the plurality of components in the same or similar manner as they are performed by a corresponding one of the plurality of components before the integration. According to one or more embodiments, operations performed by the module, the program, or another component may be carried out sequentially, in parallel, repeatedly, or heuristically, or one or more of the operations may be executed in a different order or omitted, or one or more other operations may be added.

Figure 2:
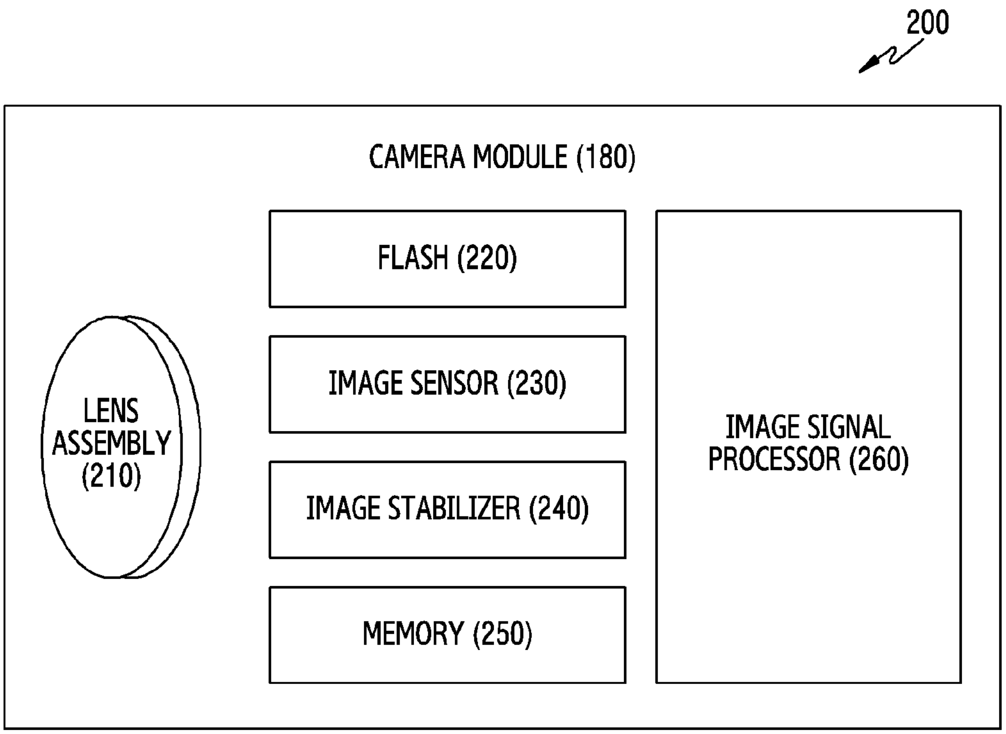
FIG. 2 illustrates a camera according to one or more embodiments.

FIG. 2 is a block diagram 200 illustrating the camera 180 according to one or more embodiments. Referring to FIG. 2, the camera 180 may include a lens assembly 210, a flash 220, an image sensor 230, an image stabilizer 240, memory 250 (e.g., buffer memory), or an image signal processor 260. The lens assembly 210 may collect light emitted or reflected from an object whose image is to be taken. The lens assembly 210 may include one or more lenses. According to an embodiment, the camera 180 may include a plurality of lens assemblies 210. In such case, the camera 180 may form, for example, a dual camera, a 360-degree camera, or a spherical camera. Some of the plurality of lens assemblies 210 may have the same lens attribute (e.g., view angle, focal length, auto-focusing, f number, or optical zoom), or at least one lens assembly may have one or more lens attributes different from those of another lens assembly. The lens assembly 210 may include, for example, a wide-angle lens or a telephoto lens.

The flash 220 may emit light that is used to reinforce light reflected from an object. According to an embodiment, the flash 220 may include one or more light emitting diodes (LEDs) (e.g., a red-green-blue (RGB) LED, a white LED, an infrared (IR) LED, or an ultraviolet (UV) LED) or a xenon lamp. The image sensor 230 may obtain an image corresponding to an object by converting light emitted or reflected from the object and transmitted via the lens assembly 210 into an electrical signal. According to an embodiment, the image sensor 230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to a movement of the camera 180 or the electronic device 101 including the camera 180. This operation of the image stabilizer 240 allows compensating for at least part of a negative effect (e.g., image blurring) by the movement on an image being captured. According to an embodiment, the image stabilizer 240 may sense such a movement by the camera 180 or the electronic device 101 using a gyro sensor (not shown) or an acceleration sensor (not shown) disposed inside or outside the camera 180. According to an embodiment, the image stabilizer 240 may be implemented, for example, as an optical image stabilizer.

The memory 250 may store, at least temporarily, at least part of an image obtained via the image sensor 230 for a subsequent image processing task. For example, if an image capturing operation is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display 160. Thereafter, if a specified condition is met (e.g., by a user's input or system command), at least part of the raw image stored in the memory 250 may be obtained and processed, for example, by the image signal processor 260. According to an embodiment, the memory 250 may be configured as at least part of the memory 130 or as a separate memory that is operated independently from the memory 130.

The image signal processor 260 may perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 260 may perform control (e.g., exposure time control or read-out timing control) with respect to at least one (e.g., the image sensor 230) of the components included in the camera 180. An image processed by the image signal processor 260 may be stored back in the memory 250 for further processing, or may be provided to an external component (e.g., the memory 130, the display 160, the electronic device 102, the electronic device 104, or the server 108) outside the camera 180. According to an embodiment, the image signal processor 260 may be configured as at least part of the processor 120, or as a separate processor that is operated independently from the processor 120. If the image signal processor 260 is configured as a separate processor from the processor 120, at least one image processed by the image signal processor 260 may be displayed, by the processor 120, via the display 160 as it is or after being further processed.

According to an embodiment, the electronic device 101 may include a plurality of cameras 180 having different attributes or functions. In such a case, at least one of the plurality of cameras 180 may form, for example, a wide-angle camera and at least another of the plurality of cameras 180 may form a telephoto camera. Similarly, at least one of the plurality of cameras 180 may form, for example, a front camera and at least another of the plurality of cameras 180 may form a rear camera.

Figure 3:
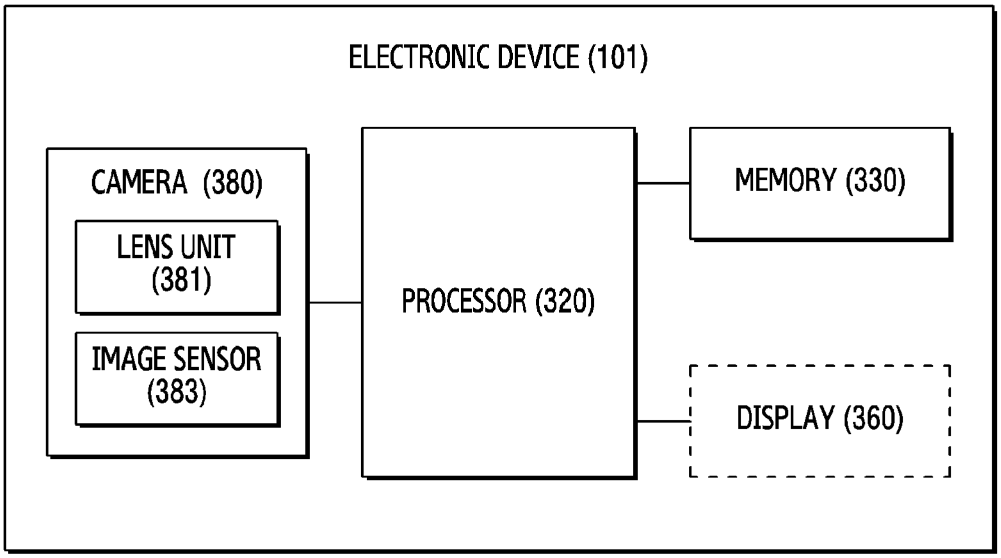
FIG. 3 illustrates a configuration of an electronic device according to an embodiment.

FIG. 3 is a block diagram illustrating a configuration of an electronic device 101 according to an embodiment.

The electronic device 101 according to an embodiment may include at least one of at least one processor (for example, the processor 120 of FIG. 1) 320, a memory (for example, the memory 130 of FIG. 1) 330, or a camera (for example, the camera 180 of FIGS. 1 and 2) 380. The electronic device 101 may further include a display (for example, the display 160 of FIG. 1) 360. The display 360 may be replaced with an external display which is connected to the electronic device 101.

In an embodiment, the camera 380 may include a lens 381 including at least one lens to collect light, and an image sensor 383 to convert an optical signal passing through the lens 381 into a digital signal. The image sensor 383 according to an embodiment may include a plurality of light receiving elements, a plurality of micro lenses, and a color filter including a plurality of color channels. The plurality of light receiving elements may include (or correspond to) photo diodes arranged in M rows and N columns to correspond to one micro lens. Herein, M and N are natural numbers greater than or equal to 2. In the disclosure, the photo diodes may be changed to other light receiving elements (e.g., a pinned-photodiode, a phototransistor, a photogate).

In an embodiment, the memory 330 may store instructions executed by the at least one processor 320. The at least one processor 320 may execute instructions stored in the memory 330 to perform computations or control elements of the electronic device 101, thereby operating the electronic device 101. In the disclosure, operations of the electronic device 101 are performed when the at least one processor 320 executes instructions. In an embodiment, the at least one processor 320 may include at least one of a central processing unit (CPU), an image signal processor (ISP) (for example, the image signal processor 260 of FIG. 2), a graphical processing unit (GPU), or a neural processing unit (NPU). For example, the at least one processor 320 may include an application processor.

In an embodiment, the at least one processor 320 may determine a shooting mode corresponding to a resolution of an image to be shot by the camera 380. For example, the at least one processor 320 may select any one of a first shooting mode (corresponding to a first resolution) or a second shooting mode (corresponding to a second resolution). The first shooting mode may be a shooting mode in which an image of a higher resolution than in the second shooting mode is generated. For example, the first resolution may be 200 mega pixel (Mp), and the second resolution may be any one of 50 Mp or 12.5 Mp. Types of shooting modes are not limited thereto and may vary according to a configuration of the image sensor. For example, the at least one processor 320 may select any one of a first shooting mode corresponding to a first resolution, a second shooting mode corresponding to a second resolution, or a third shooting model corresponding to a third resolution. Herein, the first resolution may be 200 Mp, the second resolution may be 50 Mp, and the third resolution may be 12.5 Mp. In an embodiment, the number of shooting modes selected by the at least one processor 320 may be higher than the number described above.

In an embodiment, the at least one processor 320 may control the image sensor 383 to operate based on a selected shooting mode. For example, the image sensor 383 may output first raw image data corresponding to first data that is read out such that outputs from the plurality of light receiving elements correspond to one pixel, based on the first shooting mode. The first raw image data corresponding to the first data may be understood as meaning that a pixel value of one pixel of the first raw image data is determined based on a value that is read out from a light receiving element corresponding to one photodiode. The image sensor 383 may output the first raw image data by calibrating the first data based on at least one of a zoom magnification of a camera (for example, the camera 180 of FIG. 1, the camera 380 of FIG. 3) or a focus position of a lens (for example, the lens 381 of FIG. 3). Calibrating the first data by the image sensor 383 may include compensating pixels to remove a deviation caused by other factors in addition to a deviation of data attributable to a subject by calibrating the first data. The image sensor 383 may statically compensate the first data based on a pre-defined look-up table or may dynamically correct the first data based on information of peripheral pixels in order to calibrate the first data. For example, the image sensor 383 having a 'hexadeca' pattern may require calibration due to a four photo diodes (4PD) structure, a 'tetra' pattern, a difference (Gb-Gb diff) between a green channel disposed in the same line as a blue channel and a green channel disposed in the same line as a red channel. In the disclosure, the hexadeca pattern may indicate that a pattern in which four micro lenses arranged to correspond to the same color channel are arranged adjacent to one another and four photo diodes are arranged to correspond to one micro lens is repeated. The hexadeca pattern may be configured in such an array form that micro lenses and photo diode pattern is disposed in an area corresponding to a color channel of a different color in the same manner. In the disclosure, the 4PD structure refers a pattern in which four photodiodes are arranged to correspond to one micro lens. In the disclosure, the tetra pattern refers to repetition of a pattern in which four micro lenses (arranged to correspond to the same color channel) are arranged adjacent to one another. The tetra pattern may be configured in such an array form that micro lenses and photo diode pattern is disposed in an area corresponding to a color channel of a different color in the same manner. However, this is merely for explaining an example in which a plurality of light receiving elements are arranged to correspond to one micro lens, and should not be considered as limiting.

In an embodiment, the first raw image data outputted in the first shooting mode may be data that is not image-processed by the at least one processor 320 (for example, an ISP) to perform image signal processing. For example, the first raw image data may be data that is not re-mosaicked on values read out from light receiving elements. That is, the first raw image data may be data in which a color pattern is maintained by not changing a color order of a color pattern of the image sensor 383.

In an embodiment, when an image sensor having a pattern in which micro lenses arranged to correspond to the same color channel are arranged adjacent to one another and a plurality of photo diodes are arranged in one micro lens outputs an output of one photodiode by matching to one pixel, it may be difficult to obtain an image of desired image quality through re-mosaicking. Accordingly, the electronic device 101 according to an embodiment may generate an image by using a machine learning model.

In an embodiment, the at least one processor 320 may receive the first raw image data outputted from the image sensor 383 through an interface (for example, an interface based on a MIPI protocol) which connects the image sensor 383 and the at least one processor 320. The at least one processor 320 may input the first raw image data to a prediction model. For example, the at least one processor 320 may perform neural network computations corresponding to the prediction model (e.g., a neural network model) by using at least one of a CPU, a GPU, a NPU, an ISP included in the electronic device 101, or a peripheral device. For example, the prediction model may be generated by learning expected raw image data (input image) and an image (ground truth (GT)) corresponding to a result that is desired to be acquired from the raw image data (input image). In this case, the at least one processor 320 may input the first raw image data to the prediction model and may acquire a first image as an output from the prediction model by performing computations. For example, the prediction model may be generated by learning raw image data and image data of a Bayer pattern corresponding to the raw image data. In this case, the at least one processor 320 may input the first raw image data to the prediction model, and may acquire image data of a Bayer pattern corresponding to a result of re-mosaicking. The at least one processor (for example, an ISP) 320 may acquire the first image by performing image processing (for example, de-mosaicking) with respect to the image data of the Bayer pattern. In the case of an image sensor in which a plurality of light receiving elements (for example, a plurality of photo diodes) are arranged to correspond to one micro lens, when a re-mosaicking computation is performed with respect to raw image data that are read out in a high-resolution mode through an image processing circuit (for example, an ISP chain), not through a machine learning model, an artifact may not be removed and a result with a low modulation transfer function (MTF) value may be outputted. However, when an image is acquired from raw image data by using a machine-trained prediction model, an artifact may be reduced and an image with a high MTF value may be acquired.

In an embodiment, an output of the prediction model may be implemented variously. For example, the output of the prediction model may include a first image of a RGB domain which results from completion of a post-processing process for various filters or image reinforcement. In this case, the prediction model may be generated by learning (or by being trained with) raw image data and an image of a RGB domain corresponding to the raw image data through a machine learning algorithm. For example, the output of the prediction model may include a Y, Cb, Cr (YUV) image corresponding to data before going through a post-processing process. In this case, the prediction model may be generated by learning raw image data and an image of a YUV domain from the raw image data through a machine learning algorithm. For example, the output of the prediction model may include a result of transforming raw image data into a Bayer pattern. A computation corresponding to a post-processing process of de-mosaicking (for example, white balance, gamma correction, color correction, noise reduction, sharpening) may not be included in the prediction model, but a process corresponding to de-mosaicking may be required to be performed by the prediction model.

In an embodiment, the image sensor 383 may output second raw image data corresponding to second data which is read out such that outputs of light receiving elements corresponding to two or more photo diodes among the plurality of photo diodes correspond to one pixel, based on the second shooting mode. For example, one pixel value of the second raw image data may be constituted based on a value resulting from binning of output values of two or more light receiving elements or summing of output values. The second raw data image outputted in the second shooting mode may be data for which at least one image processing operation is performed. For example, the second raw image data may correspond to a result of performing re-mosaicking with respect to values read out from light receiving elements. For example, the second raw image data may be image data having a Bayer pattern.

In an embodiment, the at least one processor 320 may receive the second raw image data outputted from the image sensor 383 through an interface which connects the image sensor 383 and the at least one processor 320. The at least one processor (for example, an ISP) 320 may acquire a second image by performing at least one image signal processing operation (for example, white balance, de-mosaicking, gamma correction, color correction, noise reduction, sharpening) with respect to the second raw image data.

Figure 4:
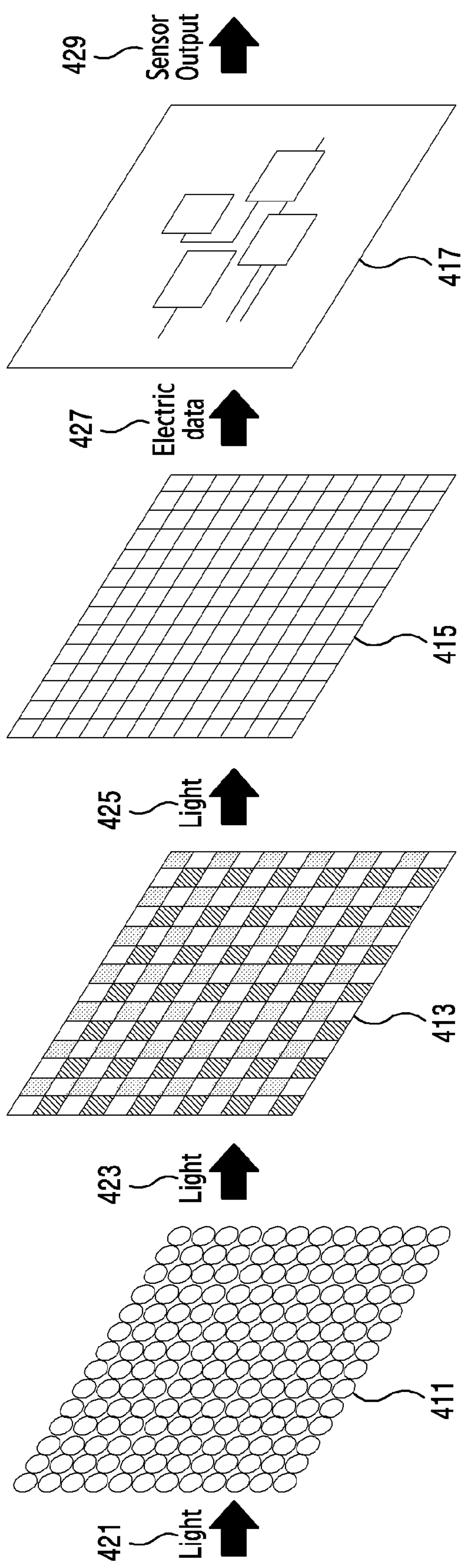
FIG. 4 illustrates a configuration of an image sensor according to an embodiment.

FIG. 4 is a view illustrating a conceptual configuration of an image sensor (for example, the image sensor 230 of FIG. 2, the image sensor 383 of FIG. 3) according to an embodiment.

In an embodiment, the image sensor (for example, the image sensor 230 of FIG. 2, the image sensor 383 of FIG. 3) may include a micro lens array (MLA) 411, a color filter 413, a light receiving panel 415, and a computation circuit 417.

In an embodiment, the micro lens array 411 may be configured to cause a light bundle 421 passing through a lens (for example, the lens 381 of FIG. 3) and imaged on the image sensor (for example, the image sensor 230 of FIG. 2, the image sensor 383 of FIG. 3) to be collected at light receiving elements of the light receiving panel 415. Light bundles 423 passing through the micro lens array 411 pass through the color filter 413 such that at least part of wavelengths except for a band corresponding to a specific color is blocked. Light bundles 425 passing through the color filter 413 may be detected by a light receiving element (for example, a photo diode) of the light receiving panel 415. The light receiving panel 415 may include a light receiving element which generates electric charges and transforms electric charges into an electrical signal upon receiving light, and a circuit to selectively read out electric charges of the light receiving element. A circuit may be disposed between the light receiving panel 415 and the computation circuit 417 to digitize a signal read out from the light receiving panel 415 or to reduce a noise.

In an embodiment, the computation circuit 417 may perform computations to process electric data 427 outputted from the light receiving panel 415. The computation circuit 417 may output data acquired based on a result of computations. An output of the computation circuit 417 may be an output of the image sensor (for example, the image sensor 230 of FIG. 2, the image sensor 383 of FIG. 3). In an embodiment, the computation circuit 417 may perform an operation of calibrating read-out data as a computation to process the electric data 427. For example, computations performed by the computation circuit 417 may include at least one of a computation of reducing a deviation between pixels caused by optical asymmetry or a relative position of a sensor, a computation of reducing a noise caused in an analogue signal, a computation of removing a defect, a computation of performing re-mosaicking, or a computation required in a specific application field (for example, a proximity sensor function, a timing adjustment function, a high dynamic range (HDR) tone mapping function). A sensor output 429 outputted from the computation circuit 417 may be inputted to the at least one processor (for example, an application processor) through an interface.

Figure 5:
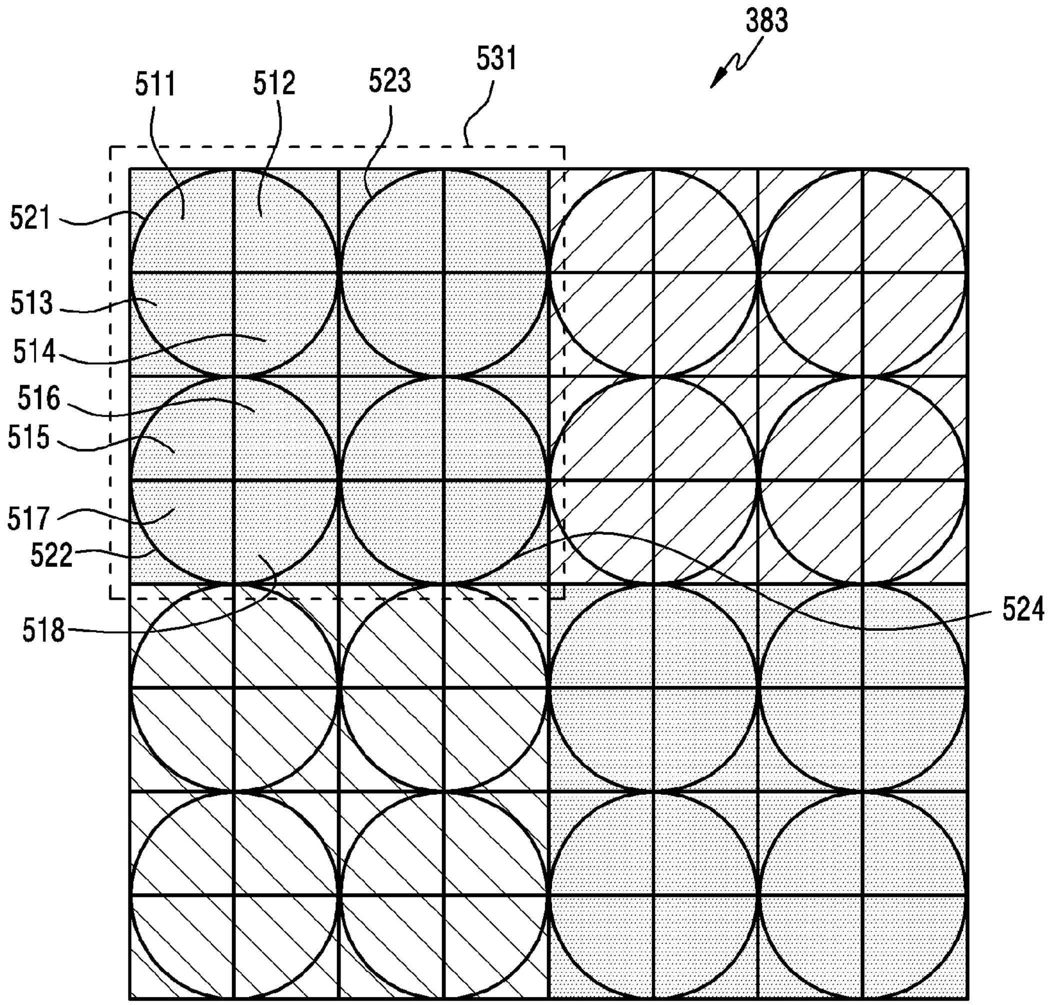
FIG. 5 illustrates an example of a pattern of a light receiving element, a micro lens, and a color filter which are arranged in an image sensor according to an embodiment.

FIG. 5 is a view illustrating an example of a pattern of a light receiving element, a micro lens, and a color filter which are arranged in an image sensor 383 according to an embodiment.

In an embodiment, four micro lenses 521, 522, 523, 524 (which are included in the image sensor 383 and are arranged in a 2×2 configuration adjacent to one another) may be arranged in the same color channel (for example, a green channel 531) of a color filter. Light receiving elements included in the image sensor 383 may be arranged such that four photo diodes arranged in a 2×2 configuration correspond to one micro lens. For example, referring to FIG. 5, a first photo diode 511, a second photo diode 512, a third photo diode 513, and a fourth photo diode 514 may be arranged to correspond to a first micro lens 521. A fifth photo diode 515, a sixth photo diode 516, a seventh photo diode 517, and an eighth photo diode 518 may be arranged to correspond to a second micro lens 522. Accordingly, sixteen (16) photo diodes (arranged in a 4×4 configuration adjacent to one another) may be arranged to correspond to one color channel.

In an embodiment, the image sensor 383 may be constituted by repeatedly arranging the pattern shown in FIG. 5. The pattern shown in FIG. 5 may be referred to as a 'hexadeca' pattern. The pattern shown in FIG. 5 is merely an example and a pattern of the image sensor 383 may be replaced with other patterns which may operate by changing a resolution. For example, a 4PD pattern that is configured such that adjacent micro lenses shown in FIG. 5 are arranged to correspond to different color channels, four light receiving elements are arranged to correspond to each micro lens, and a Bayer pattern is outputted by performing a binning computation with respect to the four light receiving elements corresponding to each micro lens may be used.

Figure 6:
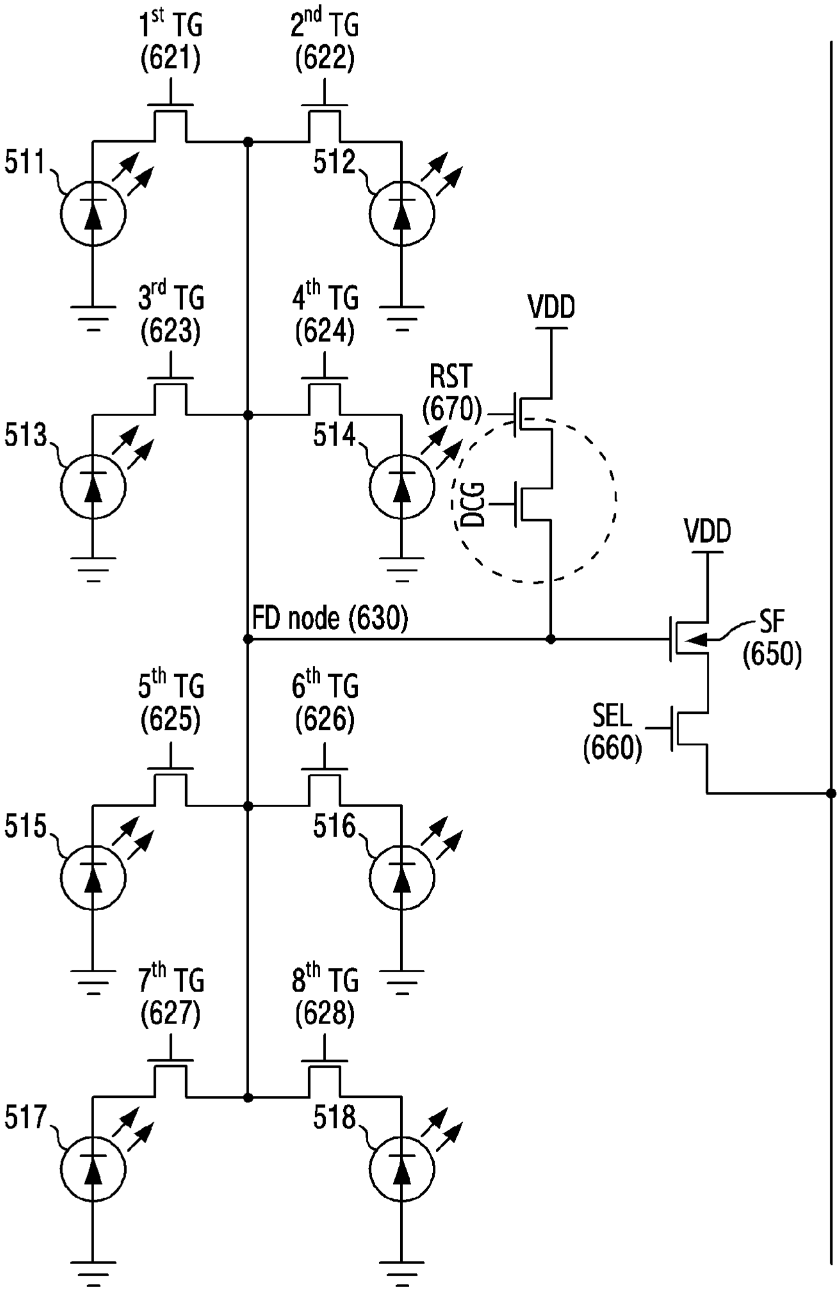
FIG. 6 illustrates an example of a circuit for outputting values of pixels included in an image sensor according to an embodiment.

FIG. 6 is a circuit diagram illustrating an example of a circuit for outputting values of pixels included in an image sensor (for example, the image sensor 383 of FIGS. 3 and 5) according to an embodiment.

In an embodiment, light receiving elements included in the image sensor (for example, the image sensor 383 of FIGS. 3 and 5) may include (or correspond to) four photo diodes (for example, the first photo diode 511, the second photo diode 512, the third photo diode 513, and the fourth photo diode 514) which are arranged to correspond to one micro lens and has a 2×2 configuration. In an embodiment, five or more photo diodes may be arranged to correspond to one micro lens. For example, nine (9) photo diodes having a 3×3 configuration may be arranged to correspond to one micro lens.

Referring to FIG. 6, four photo diodes (for example, the first photo diode 511, the second photo diode 512, the third photo diode 513, and the fourth photo diode 514) arranged to correspond to one micro lens, and fourth photo diodes (for example, the fifth photo diode 515, the sixth photo diode 516, the seventh photo diode 517, and the eighth photo diode 518) arranged to correspond to another micro lens may be connected to one floating diffusion node 630. Switches 621, 622, 623, 624, 625, 626, 627, 628 may be connected between each of the photo diodes 511, 512, 513, 514, 515, 516, 517, 518 and the floating diffusion node 630. For example, the switches 621, 622, 623, 624, 625, 626, 627, 628 may include a transistor (for example, a transistor gate).

According to an embodiment, electric charges may be accumulated in the photo didoes 511, 512, 513, 514, 515, 516, 517, 518 for an exposure time. While electric charges are accumulated, a switch may disconnect a photo diode to the floating diffusion node 630 by maintaining an opened state. When the switch is closed, the photo diode is connected to the floating diffusion node 630 such that accumulated electric charges are moved to the floating diffusion node 630. For example, electric charges accumulated in the first photo diode 511 may be moved to the floating diffusion node 630 when the first switch 621 is closed. Electric charges stored in the floating diffusion node 630 may be read out through a source follower 650 and may be outputted as an electric signal. The image sensor (for example, the image sensor 383 of FIGS. 3 and 5) may acquire analogue data corresponding to electric charges moved to the floating diffusion node 630. For example, analogue data may include information regarding an amount of electric charges accumulated in at least one photo diode for an exposure time.

In an embodiment, a line selector 660 may be controlled in an on or off state to output analogue data regarding a selected line.

In an embodiment, the image sensor (for example, the image sensor 383 of FIGS. 3 and 5) may acquire analogue data corresponding pixel values of raw image data. For example, the image sensor (for example, the image sensor 383 of FIGS. 3 and 5) may control the switches 621, 622, 623, 624, 625, 626, 627, 628 to acquire analogue data corresponding to light quantity data acquired through at least one of the photo diodes 511, 512, 513, 514, 515, 516, 517,

518. When the image sensor (for example, the image sensor 383 of FIGS. 3 and 5) turns on the first switch 621 to close the switch, the image sensor (for example, the image sensor 383 of FIGS. 3 and 5) may acquire analogue data based on light quantity data acquired through the first photo diode 511.

In an embodiment, after acquiring analogue data, the image sensor (for example, the image sensor 383 of FIGS. 3 and 5) may perform a reset operation of turning on a reset switch (for example, a reset transistor) 670 and removing electric charges accumulated in the floating diffusion node. The image sensor (for example, the image sensor 383 of FIGS. 3 and 5) may read out a value detected from each of the photo diodes 511, 512, 513, 514, 515, 516, 517, 518 as one pixel value by performing reset operations alternately at time intervals while turning on the switches 621, 622, 623, 624, 625, 626, 627, 628 in sequence one by one. For example, when operating based on a first shooting mode to generate a high-pixel (for example, 200 Mp) image, the image sensor (for example, the image sensor 383 of FIGS. 3 and 5) may read out a value detected from each of the photo diodes 511, 512, 513, 514, 515, 516, 517, 518 as one pixel value.

In an embodiment, when the first switch 621, the second switch 622, the third switch 623 and the fourth switch 624 are turned on concurrently, electric charges accumulated in the first photo diode 511, the second photo diode 512, the third photo diode 513, and the fourth photo diode 514 may be moved to the floating diffusion node 630. In this case, by analoguely summing light quantities corresponding to the first photo diode 511, the second photo diode 512, the third photo diode 513, and the fourth photo diode 514, the image sensor (for example, the image sensor 383 of FIGS. 3 and 5) may acquire light quantity data corresponding to one micro lens (for example, the first micro lens 521 of FIG. 5). For example, when operating based on a second shooting mode to generate an image of a lower pixel (for example, 50 Mp) than in the first shooting mode, the image sensor (for example, the image sensor 383 of FIGS. 3 and 5) may read out a value resulting from summing of electric charges accumulated in the first photo diode 511, the second photo diode 512, the third photo diode 513, and the fourth photo diode 514 as one pixel value.

In an embodiment, when the switches 621, 622, 623, 624, 625, 627, 628 are turned on concurrently, electric charges accumulated in the photo diodes 511, 512, 513, 514, 515, 516, 517, 518 may be moved to the floating diffusion node 630. In this case, by analoguely summing light quantities corresponding to the eight (8) photo diodes 511, 512, 513, 514, 515, 516, 517, 518, the image sensor (for example, the image sensor 383 of FIGS. 3 and 5) may acquire light quantity data corresponding to two micro lenses (for example, the first micro lens 521 and the second micro lens 522 of FIG. 5). The image sensor (for example, the image sensor 383 of FIGS. 3 and 5) may acquire light quantity data corresponding to similarly adjacent micro lens (for example, the third micro lens 523 and the fourth micro lens 524 of FIG. 5), and then, may sum with the light quantity data corresponding to the two micro lenses (for example, the first micro lens 521 and the second micro lens 522 of FIG. 5), and may read out a value corresponding to one color channel (for example, the green channel 531 of FIG. 5) as one pixel value. For example, when operating based on a third shooting mode to generate an image of a lower pixel (for example, 12.5 Mp) than in the second shooting mode, the image sensor (for example, the image sensor 383 of FIGS. 3 and 5) may read out a value resulting from summing of electric charges accumulated in photo diodes corresponding to four micro lenses (for example, the first micro lens 521, the second micro lens 522, the third micro lens 523, and the fourth micro lens 524 of FIG. 5) as one pixel value. Herein, read-out pixel values may have a color order according to a Bayer pattern.

In an embodiment, when the first switch 621, the third switch 623, the fifth switch 625, and the seventh switch 627 are turned on with the second switch 622, the fourth switch 624, the sixth switch 626, and the eighth switch 628 off, the image sensor (for example, the image sensor 383 of FIGS. 3 and 5) may acquire a luminance value regarding left pixels of the micro lens. When the second switch 622, the fourth switch 624, the sixth switch 626, and the eighth switch 628 are turned on with the first switch 621, the third switch 623, the fifth switch 625, and the seventh switch 627 off, the image sensor may acquire a luminance value regarding right pixels. An electronic device (for example, the electronic device 101 of FIGS. 1 and 3) may acquire phase difference information based on a correlation between the left pixel value and the right pixel value. However, this is just for explaining an example, and a method for acquiring a left pixel value and a right pixel value is not limited thereto. For example, the electronic device (for example, the electronic device 101 of FIGS. 1 and 3) according to an embodiment may output a luminance value corresponding to the first photo diode 511 and the third photo diode 513, and a luminance value corresponding to the fifth photo diode 515 and the seventh photo diode 517 as individual left pixel values.

In the first shooting mode in which sixteen (16) pixels are outputted from an active pixel sensor array (APS), respectively, raw image data of a highest resolution may be outputted, but many artifacts may occur even when re-mosaicking is performed with respect to outputted data.

Figure 7:
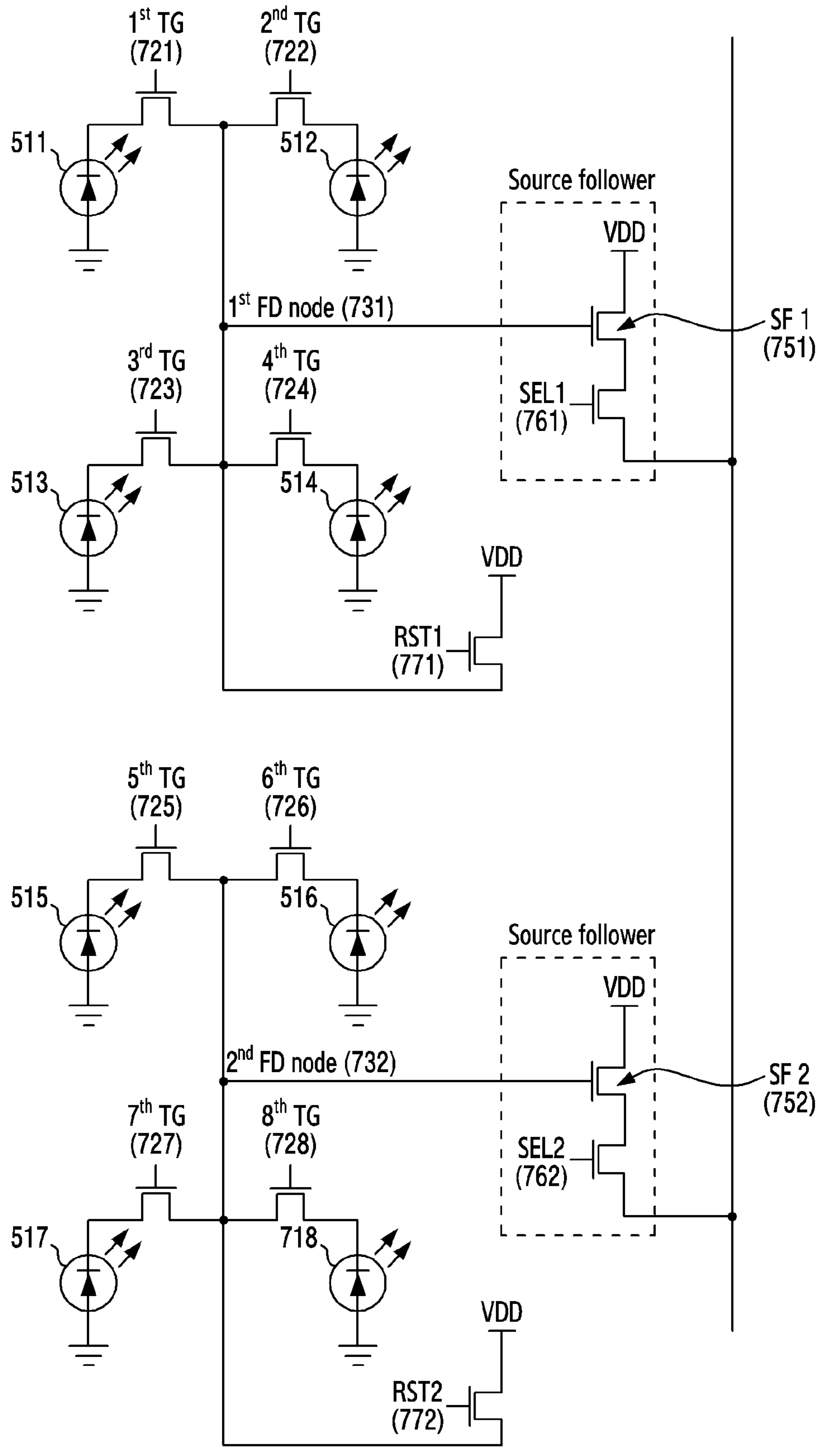
FIG. 7 illustrates another example of a circuit for outputting values of pixels included in an image sensor according to an embodiment.

FIG. 7 is a circuit diagram illustrating another example of a circuit for outputting values of pixels included in an image sensor (for example, the image sensor 383 of FIGS. 3 and 5) according to an embodiment.

In an embodiment, a first photo diode 511, a second photo diode 512, a third photo diode 513, and a fourth photo diode 514 may be connected to a first floating diffusion node 731 through a first switch 721, a second switch 722, a third switch 723, and a fourth switch 724, respectively. Compared to those in the circuit diagram of FIG. 6, a fifth photo diode 515, a sixth photo diode 516, a seventh photo diode 517, and an eighth photo diode 518 may not share the first floating diffusion node 731 with the first photo diode 511, the second photo diode 512, the third photo diode 513, and the fourth photo diode 514. The fifth photo diode 515, the sixth photo diode 516, the seventh photo diode 517, and the eighth photo diode 518 may be connected to a second floating diffusion node 732 through a fifth switch 725, a sixth switch 726, a seventh switch 727, and an eighth switch 728, respectively.

In an embodiment, in a state that a first selector 761 is turned on to read out data of a line including at least one of the first photo diode 511, the second photo diode 512, the third photo diode 513, and the fourth photo diode 514, analogue data may be outputted through a first source follower 751 based on electric charges stored in the first floating diffusion node 731. After analogue data is outputted, a first reset switch 771 may be turned on such that electric charges accumulated in the first floating diffusion node 731 may be removed.

In an embodiment, in a state that a second selector 762 is turned on to read out data of a line including at least one of the fifth photo diode 515, the sixth photo diode 516, the seventh photo diode 517, and the eighth photo diode 518, analogue data may be outputted through a second source follower 752 based on electric charges stored in the second floating diffusion node 732. After analogue data is outputted, a second reset switch 772 may be turned on such that electric charges accumulated in the second floating diffusion node 732 may be removed.

Figure 8:
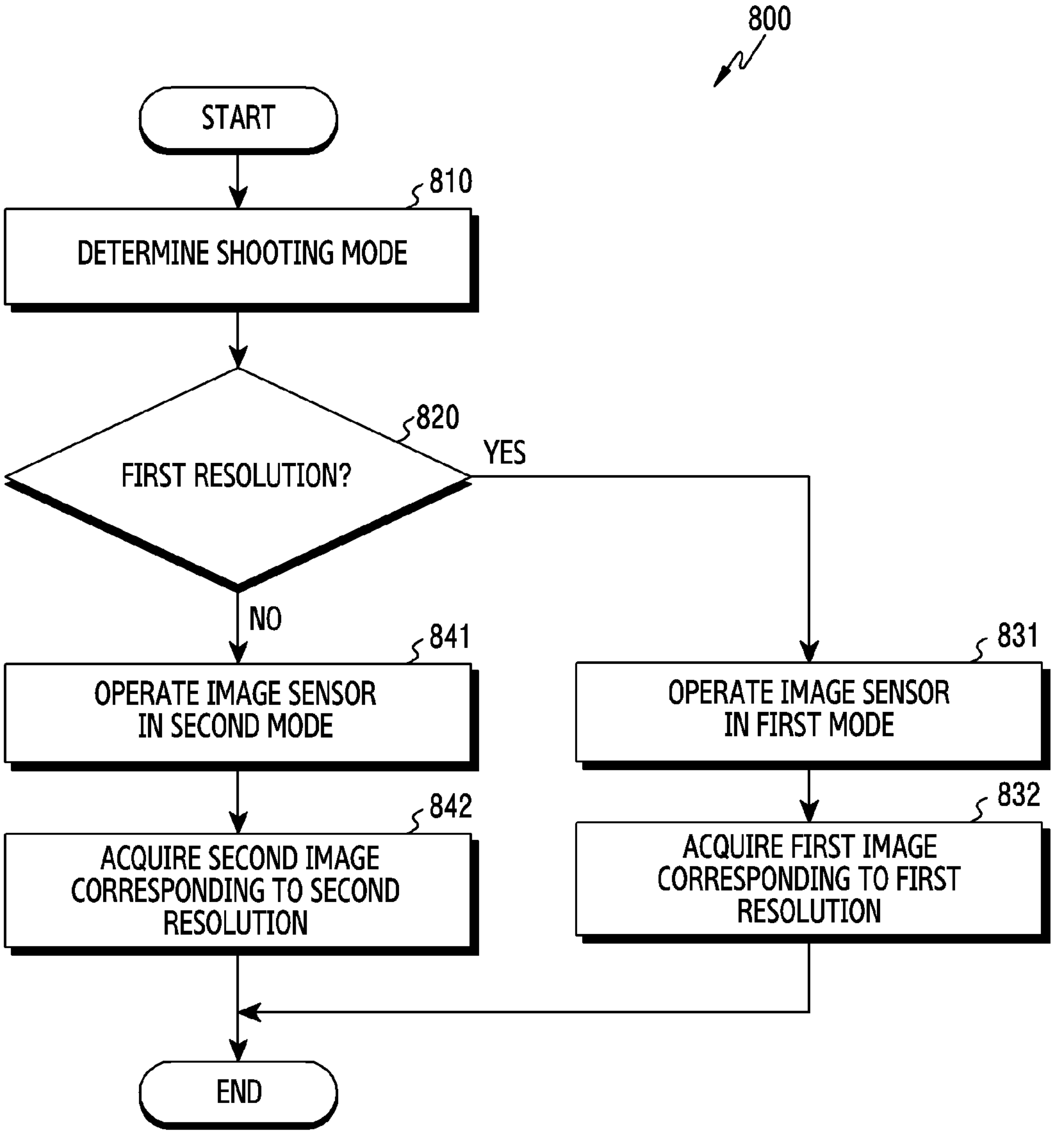
FIG. 8 illustrates a process of acquiring an image by an electronic device according to an embodiment.

FIG. 8 is a flowchart 800 illustrating operations acquiring an image by an electronic device (for example, the electronic device 101 of FIGS. 1 and 3) according to an embodiment. In the disclosure, operations performed by the electronic device (for example, the electronic device 101 of FIGS. 1 and 3) are performed by at least one processor (for example, the processor 120 of FIG. 1, the image signal processor 260 of FIG. 2, at least one processor 320 of FIG. 3) executing instructions stored in a memory (for example, the memory 130 of FIG. 1, the memory 330 of FIG. 3).

In operation 810, the electronic device (for example, the electronic device 101 of FIGS. 1 and 3) according to an embodiment may determine a shooting mode for shooting an image. For example, the electronic device (for example, the electronic device 101 of FIGS. 1 and 3) may receive a user input for selecting a shooting mode, and may determine a shooting mode based on the received user input. Alternatively, for example, the electronic device (for example, the electronic device 101 of FIGS. 1 and 3) may determine a shooting mode for shooting an image based on default setting. Alternatively, for example, the electronic device (for example, the electronic device 101 of FIGS. 1 and 3) may determine a shooting mode for shooting an image based on a previously set shooting mode.

In operation 820, the electronic device (for example, the electronic device 101 of FIGS. 1 and 3) according to an embodiment may determine whether the determined shooting mode is a first shooting mode corresponding to a first resolution. When the determined shooting mode is the first shooting mode, the electronic device (for example, the electronic device 101 of FIGS. 1 and 3) may control an image sensor (for example, the image sensor 230 of FIG. 2, the image sensor 383 of FIG. 3) to output first raw image data corresponding to the first resolution, based on a first mode in operation 831. For example, the electronic device (for example, the electronic device 101 of FIGS. 1 and 3) may control the image sensor (for example, the image sensor 230 of FIG. 2, the image sensor 383 of FIG. 3) to output first raw image data corresponding to a resolution of 200 Mp. Herein, the first raw image data may be obtained by calibrating first data read out from a light receiving panel of the image sensor (for example, the image sensor 230 of FIG. 2, the image sensor 383 of FIG. 3) without remosaicking. The first raw image data outputted by the image sensor (for example, the image sensor 230 of FIG. 2, the image sensor 383 of FIG. 3) in operation 831 may be data that is configured such that an output of a light receiving element corresponding to one photo diode corresponds to one pixel.

In an embodiment, the electronic device (for example, the electronic device 101 of FIGS. 1 and 3) may enable the image sensor to output raw image data according to a determined resolution. For example, when the determined shooting mode is the first shooting mode corresponding to the first resolution, the image sensor may operate based on the first mode to output the first raw image data in which an output of a first light receiving element corresponding to one photo diode among the plurality of photo diodes included in the image sensor corresponds to one pixel. When the determined shooting mode is a second shooting mode corresponding to a second resolution that is lower than the first resolution, the image sensor may operate based on a second mode to output second raw image data in which outputs of second light receiving elements corresponding to at least two photo diodes (for example, photo diodes 511, 512, 513, 514 of an M×N configuration arranged to correspond to one micro lens 521, or photo diodes arranged to correspond to a plurality of micro lenses 521, 522, 523, 524) among the plurality of photo diodes included in the image sensor correspond to one pixel.

In operation 832, the electronic device (for example, the electronic device 101 of FIGS. 1 and 3) according to an embodiment may acquire a first image of the first resolution based on the first raw image data. The first image may be an image of a RGB domain that has a RGB value regarding each pixel. In an embodiment, the electronic device (for example, the electronic device 101 of FIGS. 1 and 3) may acquire the first image by inputting the first raw image data to a prediction model which is generated based on machine learning (a machine learning model). For example, the electronic device (for example, the electronic device 101 of FIGS. 1 and 3) may output the first image by performing computations corresponding to the prediction model. Alternatively, for example, the electronic device (for example, the electronic device 101 of FIGS. 1 and 3) may acquire data that may be processed by an image signal processor (for example, the image signal processor 260 of FIG. 2) of the electronic device (for example, the electronic device 101 of FIGS. 1 and 3) by performing computations corresponding to the prediction model. The electronic device (for example, the electronic device 101 of FIGS. 1 and 3) may acquire the first image by performing image processing with respect to data acquired from an output of the prediction model through the image signal processor (for example, the image signal processor 260 of FIG. 2).

The prediction model may be generated by inputting, to a machine learning model, an input database in which raw image data regarding a ground truth image is artificially generated and the ground truth image is stored as a label regarding the raw image data. Alternatively, for example, the prediction model may be generated by inputting, to a machine learning model, an input database in which a ground truth image is generated by binning pixels of raw image data and which is configured through sampling for each micro lens position. However, the above-described methods of generating a prediction model are merely examples and are not limited.

When the determined shooting mode is the second shooting mode, the electronic device (for example, the electronic device 101 of FIGS. 1 and 3) according to an embodiment may control the image sensor (for example, the image sensor 230 of FIG. 2, the image sensor 383 of FIG. 3) to output the second raw image data corresponding to the second resolution based on the second mode in operation 841. For example, the electronic device (for example, the electronic device 101 of FIGS. 1 and 3) may control the image sensor (for example, the image sensor 230 of FIG. 2, the image sensor 383 of FIG. 3) to output the second raw image data corresponding to a resolution of 50 Mp. Herein, the second raw image data may be data to which re-mosaicking is applied. The second raw image data outputted by the image sensor (for example, the image sensor 230 of FIG. 2, the image sensor 383 of FIG. 3) in operation 841 may be data that is configured such that outputs of light receiving elements corresponding to a plurality of photo diodes correspond to one pixel. For example, the number of the plurality of photo diodes may be the number of a plurality of photo diodes (for example, M×N photo diodes) arranged to correspond to one micro lens.

In operation 842, the electronic device (for example, the electronic device 101 of FIGS. 1 and 3) according to an embodiment may acquire a second image of the second resolution, based on the second raw image data. In an embodiment, the electronic device (for example, the electronic device 101 of FIGS. 1 and 3) may acquire the second image by performing at least one image signal processing operation (for example, white balance, de-mosaicking, gamma correction, color correction, noise reduction, sharpening) with respect to the second raw image data. Herein, the second image may be, for example, an image of a RGB domain having a RGB value for each pixel.

Figure 9:
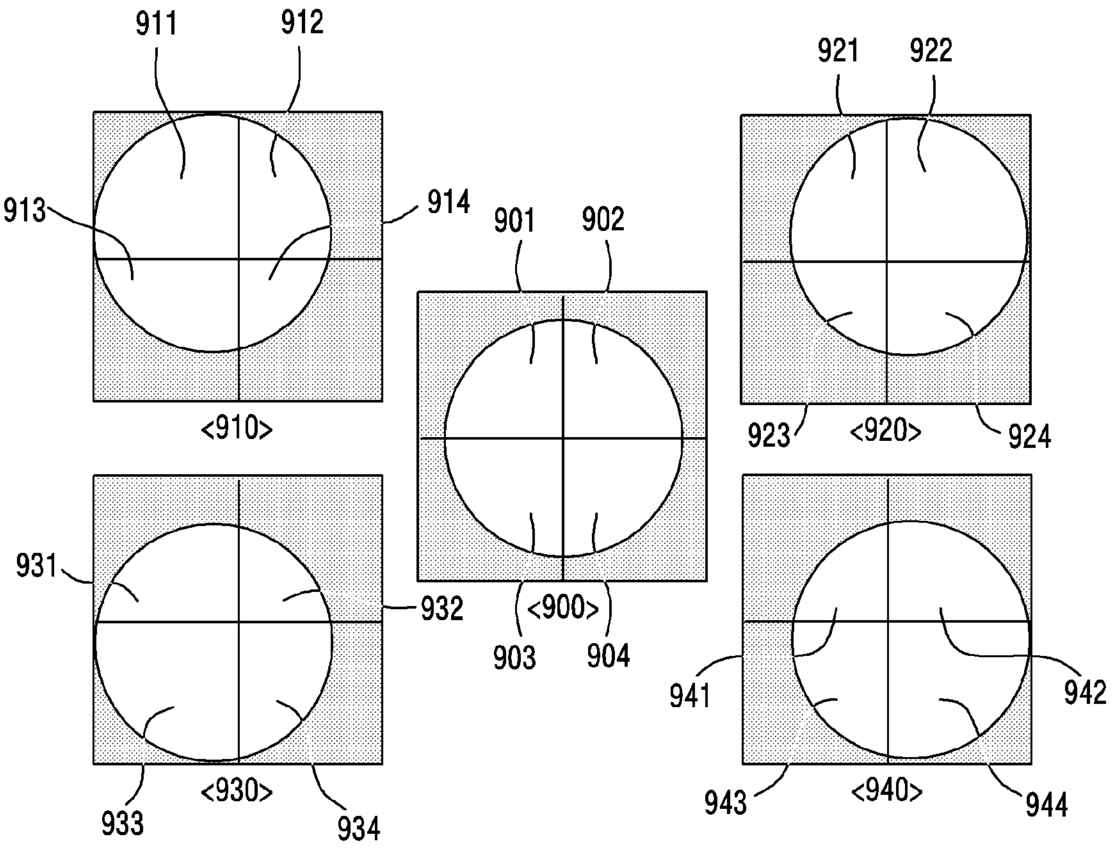
FIG. 9 illustrates lens pupils allocated to light receiving elements included in an image sensor of an electronic device according to an embodiment.

FIG. 9 illustrates lens pupils allocated to light receiving elements (for example, the photo diodes 511, 512, 513, 514 of FIG. 5) included in an image sensor (for example, the image sensor 230 of FIG. 2, the image sensor 383 of FIG. 3) of an electronic device (for example, the electronic device 101 of FIGS. 1 and 3).

In an embodiment, the image sensor (for example, the image sensor 230 of FIG. 2, the image sensor 383 of FIG. 3) may output first raw image data having a high pixel (for example, 200 Mp) by reading out electric charges accumulated in light receiving elements (for example, the first photo diode 511, the second photo diode 512, the third photo diode 513, the fourth photo diode 514, the fifth photo diode 515, the sixth photo diode 516, the seventh photo diode 517, and the eighth photo diode 518 of FIGS. 5 to 7) in sequence while operating based on a first shooting mode. However, when a plurality of photo diodes are arranged to correspond to one micro lens as shown in FIG. 5, light entering one micro lens may be split and received by the plurality of photo diodes. Since a major direction of light entering a lens may vary according to a position within an image sensor (for example, the image sensor 230 of FIG. 2, the image sensor 383 of FIG. 3), a ratio at which light is split may vary according to a photo diode.

For example, referring to 900 of FIG. 9, light is split at an equal ratio by four photo diodes. In the disclosure, areas in which light is split by photo diodes may be referred to as pupil allocated areas. Referring to 900 of FIG. 9, a left-upper end pupil allocated area 901, a right-upper end pupil allocated area 902, a left-lower end pupil allocated area 903, and a right-lower end pupil allocated area 904 may be split to have a substantially uniform width.

Referring to 910 of FIG. 9, a lens pupil may be biased toward a left-upper end. Due to biasing of the lens pupil, a left-upper end pupil allocated area 911 may be larger than the other pupil allocated areas 912, 913, 914. Referring to 920 of FIG. 9, a lens pupil may be biased toward a right-upper end. Due to biasing of the lens pupil, a right-upper end pupil allocated area 922 may be larger than the other pupil allocated areas 921, 923, 924. Referring to 930 of FIG. 9, a lens pupil may be biased toward a left lower end. Due to biasing of the lens pupil, a left-lower end pupil allocated area 933 may be larger than the other pupil allocated areas 931, 932, 934. Referring to 940 of FIG. 9, a lens pupil may be biased toward a right lower end. Due to biasing of the lens pupil, a right-lower end pupil allocated area 944 may be larger than the other pupil allocated areas 941, 942, 943.

In an embodiment, the image sensor (for example, the image sensor 230 of FIG. 2, the image sensor 383 of FIG. 3) may output the first raw image data based on a result of calibrating unequal sizes of pupil allocated areas for the respective photo diodes. Since the major direction of light entering the lens may vary according to a zoom magnification of a camera or a focus position of the lens, the image sensor (for example, the image sensor 230 of FIG. 2, the image sensor 383 of FIG. 3) according to an embodiment may calibrate first data which is read out from photo diodes based on the zoom magnification or the focus position. For example, the image sensor (for example, the image sensor 230 of FIG. 2, the image sensor 383 of FIG. 3) may include a processor which receives information regarding at least one of a zoom magnification or lens position and calibrates first data.

Figure 10:
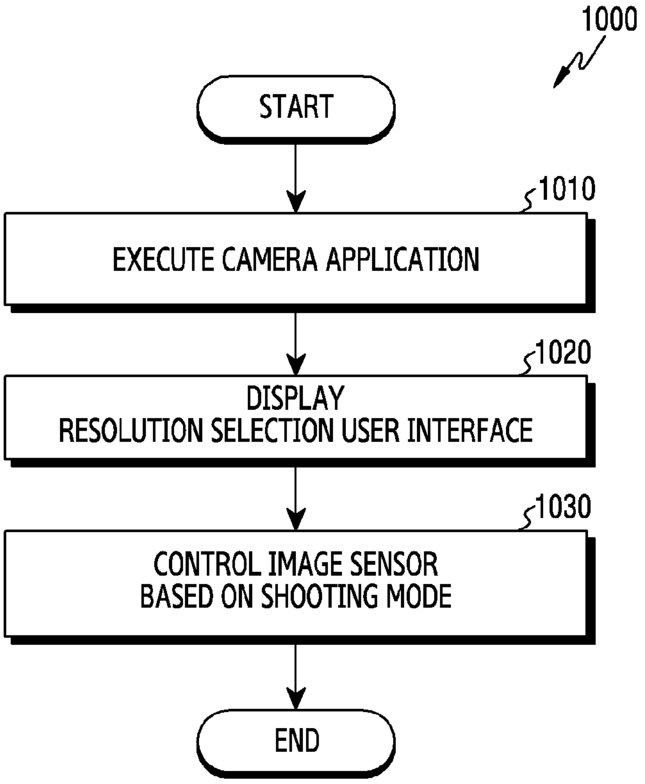
FIG. 10 illustrates a process of selecting a shooting mode by an electronic device according to an embodiment.

FIG. 10 is a flowchart 1000 illustrating operations selecting a shooting mode by an electronic device (for example, the electronic device 101 of FIGS. 1 and 3) according to an embodiment.

Operations of FIG. 10 may be performed in an operation of selecting a shooting mode by the electronic device (for example, the electronic device 101 of FIGS. 1 and 3). For example, operations included in the flowchart 1000 illustrated in FIG. 10 may be executed in a process of performing operation 810 of FIG. 8.

In operation 1010, the electronic device (for example, the electronic device 101 of FIGS. 1 and 3) according to an embodiment may execute a camera application. The camera application may include an application which provides a service for shooting an image through a camera (for example, the camera 180 of FIGS. 1 and 2, the camera 380 of FIG. 3) of the electronic device (for example, the electronic device 101 of FIGS. 1 and 3). For example, the camera application may include a shooting application which makes a still image and/or a moving image and stores the same, a video call application which transmits an image made through a camera (for example, the camera 180 of FIGS. 1 and 2, the camera 380 of FIG. 3) to another camera, or a broadcasting application which streams a video made through a camera (for example, the camera 180 of FIGS. 1 and 2, the camera 380 of FIG. 3) to the outside.

In operation 1020, the electronic device (for example, the electronic device 101 of FIGS. 1 and 3) according to an embodiment may display a user interface for selecting a resolution based on the executed camera application through a display (for example, the display 160 of FIG. 1, the display 360 of FIG. 3).

Figure 11:
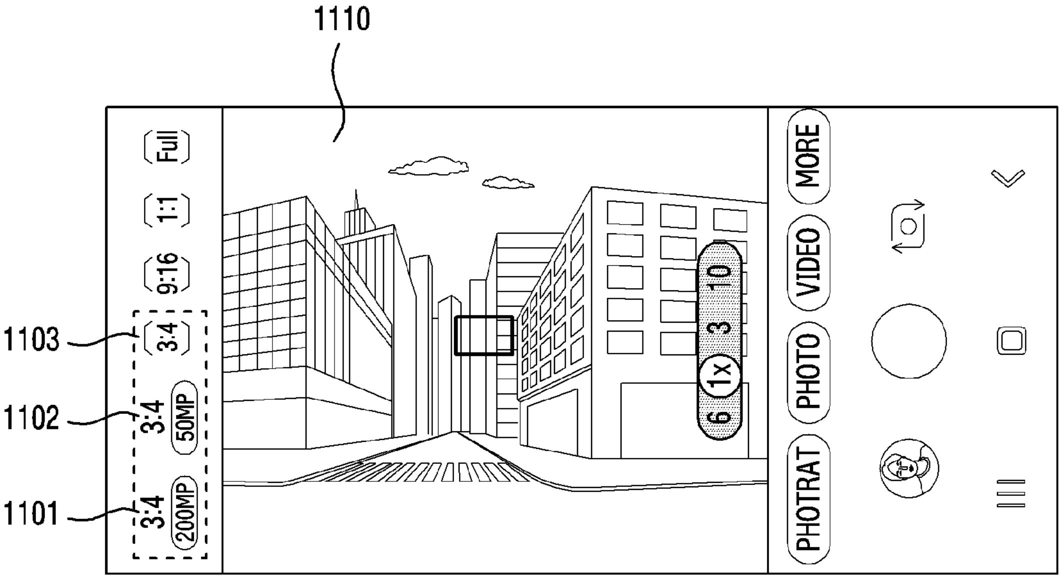
FIG. 11 illustrates an example of a screen including a resolution selection user interface displayed by an electronic device according to an embodiment.

For example, FIG. 11 illustrates an example of a screen including a resolution selection user interface displayed by the electronic device (for example, the electronic device 101 of FIGS. 1 and 3) according to an embodiment. In an embodiment, the electronic device (for example, the electronic device 101 of FIGS. 1 and 3) may display a screen including a user interface including at least one item for selecting a resolution. Referring to FIG. 11, the user interface for selecting a resolution may include at least one of a first icon 1101 corresponding to a first resolution, a second icon 1102 corresponding to a second resolution, or a third icon 1103 corresponding to a third resolution.

In an embodiment, the electronic device (for example, the electronic device 101 of FIGS. 1 and 3) may determine a shooting mode based on a user input (for example, a touch input). For example, when a touch input corresponding to a position where the first icon 1101 is displayed is received, the electronic device may determine a first shooting mode in which an image having a resolution of 200 Mp is generated. When a touch input corresponding to a position where the second icon 1102 is displayed is received, the electronic device may determine a second shooting mode in which an image having a resolution of 50 Mp is generated. When a touch input corresponding to a position where the third icon 1103 is displayed is received, the electronic device may determine a third shooting mode in which an image having a resolution of 12.5 Mp is generated. However, resolution values presented in the disclosure are merely examples and may be changed.

In operation 1030, the electronic device (for example, the electronic device 101 of FIGS. 1 and 3) according to an embodiment may control an image sensor (for example, the image sensor 230 of FIG. 2, the image sensor 383 of FIG. 3) based on the determined shooting mode. In operation 1030, the electronic device (for example, the electronic device 101 of FIGS. 1 and 3) according to an embodiment may control the image sensor (for example, the image sensor 230 of FIG. 2, the image sensor 383 of FIG. 3) to output raw image data for acquiring an image corresponding to the determined shooting mode.

For example, when the determined shooting mode is the first shooting mode, the electronic device (for example, the electronic device 101 of FIGS. 1 and 3) may control the image sensor (for example, the image sensor 230 of FIG. 2, the image sensor 383 of FIG. 3) to read out electric charge values accumulated in respective light receiving elements (for example, the first photo diode 511, the second photo diode 512, the third photo diode 513, the fourth photo diode 514, the fifth photo diode 515, the sixth photo diode 516, the seventh photo diode 517, and the eighth photo diode 518 of FIGS. 5 to 7) individually and in sequence. The image sensor (for example, the image sensor 230 of FIG. 2, the image sensor 383 of FIG. 3) may output first raw image data including pixels corresponding to the read-out electric charge values. A pattern of the pixels included in the first raw image data may be different from a Bayer pattern.

For example, when the determined shooting mode is the second shooting mode, the electronic device (for example, the electronic device 101 of FIGS. 1 and 3) may read out electric charges accumulated in light receiving elements (for example, the first photo diode 511, the second photo diode 512, the third photo diode 513, and the fourth photo diode 514 of FIGS. 5 to 7) corresponding to photo diodes of a 2×2 configuration of the image sensor (for example, the image sensor 230 of FIG. 2, the image sensor 383 of FIG. 3), concurrently, through one floating diffusion node. Thereafter, the image sensor (for example, the image sensor 230 of FIG. 2, the image sensor 383 of FIG. 3) may read out electric charges accumulated in light receiving elements (for example, the fifth photo diode 515, the sixth photo diode 516, the seventh photo diode 517, and the eighth photo diode 518 of FIGS. 5 to 7) corresponding to other photo diodes of a 2×2 configuration concurrently. The image sensor (for example, the image sensor 230 of FIG. 2, the image sensor 383 of FIG. 3) may output second raw image data having a Bayer pattern by performing re-mosaicking with respect to data including the read-out electric charge values.

For example, when the determined shooting mode is the third shooting mode, the electronic device (for example, the electronic device 101 of FIGS. 1 and 3) may read out electric charge values accumulated in light receiving elements (for example, the first photo diode 511, the second photo diode 512, the third photo diode 513, the fourth photo diode 514, the fifth photo diode 515, the sixth photo diode 516, the seventh photo diode 517, the eighth photo diode 518 of FIGS. 5 to 7) corresponding to photo diodes of a 4×2 configuration of the image sensor (for example, the image sensor 230 of FIG. 2, the image sensor 383 of FIG. 3) concurrently. The image sensor (for example, the image sensor 230 of FIG. 2, the image sensor 383 of FIG. 3) may convert the result of reading out into a first digital value through an analog-to-digital converter (ADC). The image sensor (for example, the image sensor 230 of FIG. 2, the image sensor 383 of FIG. 3) may acquire one pixel value corresponding to one color channel (for example, the green channel 531 of FIG. 5) by digitally merging the first digital value and a second digital value which is acquired from an adjacent 4×2 configuration (for example, a value read out from photo diodes corresponding to the third micro lens 523 and the fourth micro lens 524 of FIG. 5). That is, the image sensor (for example, the image sensor 230 of FIG. 3, the image sensor 383 of FIG. 3) may acquire one pixel value based on values detected through light receiving elements corresponding to photo diodes of a 4×4 configuration. In the case of a hexadeca pattern shown in FIG. 5, when pixel values are acquired for each color channel, the pixel values may be arranged according to a Bayer pattern. In this case, the image sensor (for example, the image sensor 230 of FIG. 2, the image sensor 383 of FIG. 3) may output third raw image data having a Bayer pattern without going through a re-mosaicking process.

In an embodiment, the electronic device (for example, the electronic device 101 of FIGS. 1 and 3) may display a preview screen 1110 corresponding to an image acquired based on the selected shooting mode through the display.

However, the method illustrated in FIG. 10 is merely an example of a method of selecting a shooting mode by the electronic device (for example, the electronic device 101 of FIGS. 1 and 3), and the method of selecting a shooting mode by the electronic device (for example, the electronic device 101 of FIGS. 1 and 3) is not limited to the flowchart 1000 illustrated in FIG. 10. For example, the electronic device (for example, the electronic device 101 of FIGS. 1 and 3) may select a shooting mode based on whether information acquired through a sensor (for example, the sensor 176 of FIG. 1) included in the electronic device (for example, the electronic device 101 of FIGS. 1 and 3) satisfies a predefined condition.

Figure 12:
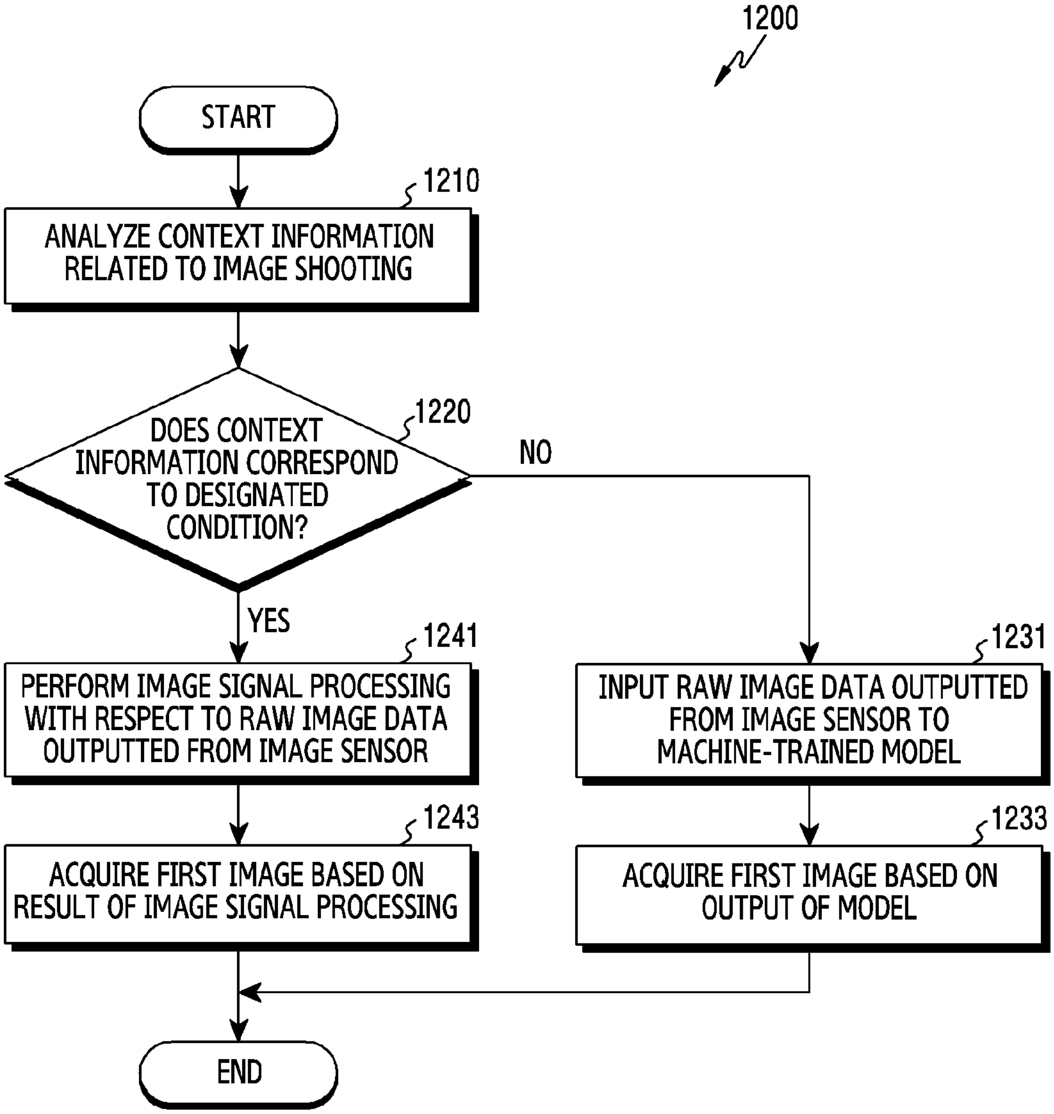
FIG. 12 illustrates a process of acquiring an image based on context information by an electronic device according to an embodiment.

FIG. 12 is a flowchart 1200 illustrating operations of acquiring an image based on context information by an electronic device (for example, the electronic device 101 of FIGS. 1 and 3) according to an embodiment. The operations in FIG. 12 may be performed in association with an operation of acquiring an image based on a machine learning model. For example, when operation 832 of FIG. 8 is performed, the operations shown in FIG. 12 may be executed.

In operation 1210, the electronic device (for example, the electronic device 101 of FIGS. 1 and 3) according to an embodiment may analyze context information related to image shooting. Context information related to image shooting may include information for determining whether the electronic device (for example, the electronic device 101 of FIGS. 1 and 3) needs to create a high-pixel image. The electronic device (for example, the electronic device 101 of FIGS. 1 and 3) according to an embodiment may acquire context information through image data acquired through a camera (for example, the camera 180 of FIGS. 1 and 2, the camera 380 of FIG. 3) or a separate sensor (for example, the sensor 176 of FIG. 1). For example, the electronic device (for example, the electronic device 101 of FIGS. 1 and 3) may acquire an illuminance value through image data or an illuminance sensor. For example, the electronic device (for example, the electronic device 101 of FIGS. 1 and 3) may acquire information regarding whether an image included in image data is a defocused image. For example, the electronic device (for example, the electronic device 101 of FIGS. 1 and 3) may acquire information regarding a high frequency component included in image data. For example, the electronic device (for example, the electronic device 101 of FIGS. 1 and 3) may acquire information (for example, night view, scene in which there exists backlight around a subject) for sorting shot scenes. However, examples of context information are not limited thereto.

In relation to operation 832 of FIG. 8, when an image is shot based on a first shooting mode, a first image of high quality may be acquired by using a machine learning model. However, machine learning such as deep learning may require a large amount of computations. Accordingly, in a contest where high image quality is not required, the electronic device (for example, the electronic device 101 of FIGS. 1 and 3) according to an embodiment may acquire the first image without performing computations based on the machine learning model. In operation 1220, the electronic device (for example, the electronic device 101 of FIGS. 1 and 3) according to an embodiment may determine whether the context information corresponds to a designated condition in order to determine whether computations using a machine learning model are required.

For example, the electronic device (for example, the electronic device 101 of FIGS. 1 and 3) may determine whether an illuminance value is less than a threshold value. For example, the electronic device (for example, the electronic device 101 of FIGS. 1 and 3) may determine whether a shot image is a defocused image. For example, the electronic device (for example, the electronic device 101 of FIGS. 1 and 3) may determine whether a size of a high frequency component included in an image is less than a threshold value. For example, the electronic device (for example, the electronic device 101 of FIGS. 1 and 3) may determine whether a shot image includes a scene included in a designated category. However, the designated condition is not limited thereto.

In an embodiment, when the context information does not correspond to the designated condition, the electronic device (for example, the electronic device 101 of FIGS. 1 and 3) may perform operation 1231 to input raw image data outputted from the image sensor (for example, the image sensor 230 of FIG. 2, the image sensor 383 of FIG. 3) to a machine-trained model. The electronic device (for example, the electronic device 101 of FIGS. 1 and 3) according to an embodiment may perform operation 1233 of acquiring the first image based on an output acquired by performing computations according to the model to which the raw image data is inputted.

In an embodiment, when the context information corresponds to the designated condition, the electronic device (for example, the electronic device 101 of FIGS. 1 and 3) may perform operation 1241 of performing image signal processing with respect to the raw image data outputted from the image sensor (for example, the image sensor 230 of FIG. 2, the image sensor 383 of FIG. 3). Herein, the image signal processing may be performed by an image signal processing chain (ISP chain) included in the electronic device (for example, the electronic device 101 of FIGS. 1 and 3). Image signal processing performed in operation 1241 may be performed without using the machine-trained model which is used in operation 1231. For example, in operation 1241, the electronic device (for example, the electronic device 101 of FIGS. 1 and 3) may perform image processing with respect to the raw image data based on an image signal chain for performing at least one of white balance, de-mosaicking, gamma correction, color correction, noise reduction, or sharpening. In operation 1243, the electronic device (for example, the electronic device 101 of FIGS. 1 and 3) may acquire the first image based on a result of the image signal processing performed in operation 1241.

In operation 1241, the image signal processing performed by the electronic device (for example, the electronic device 101 of FIGS. 1 and 3) according to an embodiment may include converting raw image data into data to be demosaicked. Converting raw image data may include merging or binning pixels included in the raw image data. For example, when an output of one light receiving element corresponding to one photo diode included in the image sensor (for example, the image sensor 230 of FIG. 2, the image sensor 383 of FIG. 3) having the hexadeca pattern shown in FIG. 5 is configured as one pixel value, it may be difficult to acquire an image of desired quality while maintaining a resolution. However, when pixels are processed by merging as shown in FIG. 13, a resolution may be reduced, but an image of a Bayer pattern may be acquired.

Figure 13:
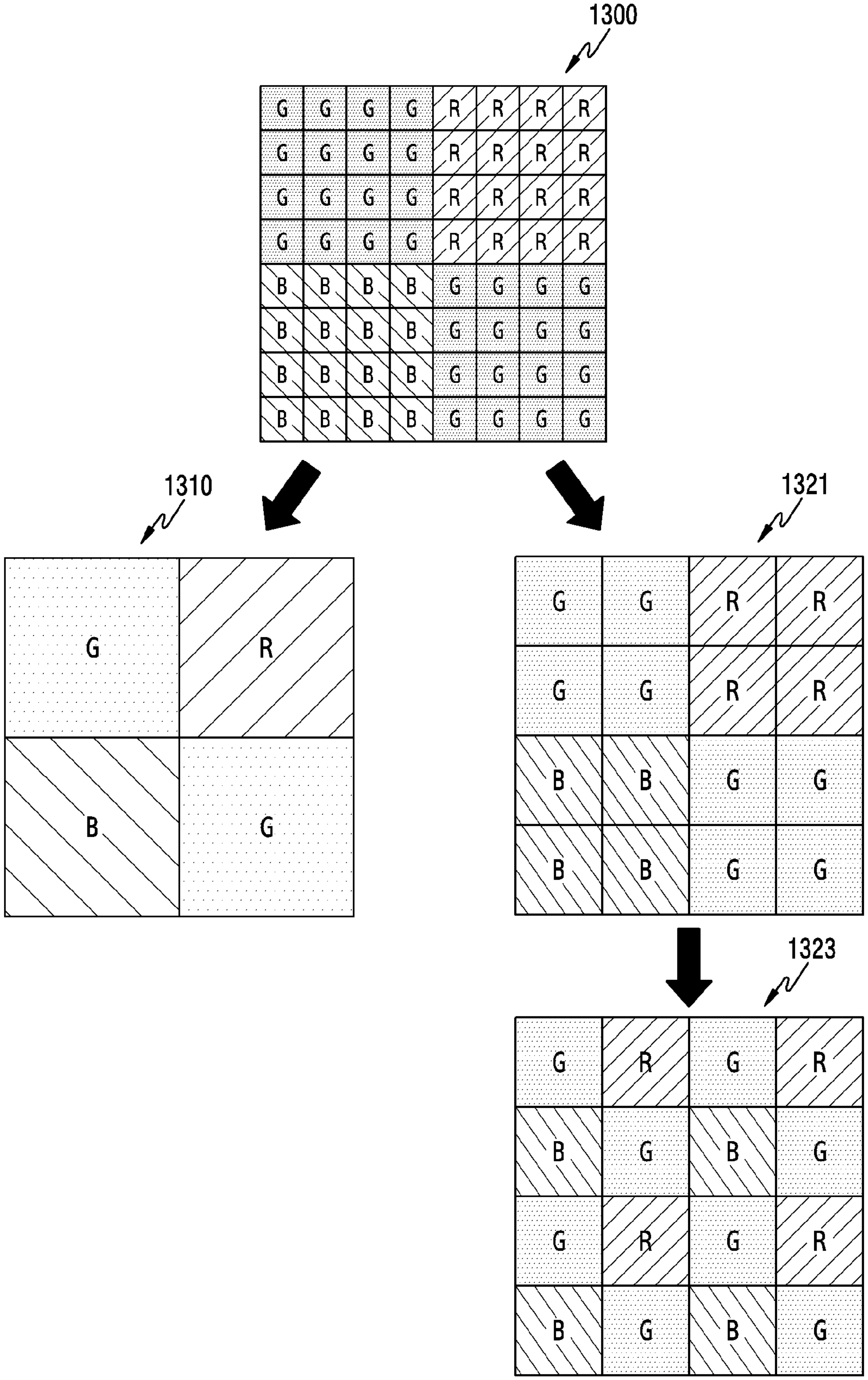
FIG. 13 illustrates a concept of an image signal processing process performed to acquire an image by an electronic device according to an embodiment.

FIG. 13 illustrate an image signal processing process performed by an electronic device (for example, the electronic device 101 of FIGS. 1 and 3) to acquire an image according to an embodiment.

In an embodiment, while operating based on a first shooting mode, an image sensor (for example, the image sensor 230 of FIG. 2, the image sensor 383 of FIG. 3) having a hexadeca pattern (as shown in FIG. 5) may output first raw image data having a first pattern 1300. For example, the first raw image data inputted to the machine-trained model in operation 1231 of FIG. 12 may have the first pattern 1300. However, in operation 1241, the electronic device (for example, the electronic device 101 of FIGS. 1 and 3) according to an embodiment may change a pattern of data outputted by the image sensor (for example, the image sensor 230 of FIG. 2, the image sensor 383 of FIG. 3) from the first pattern to a pattern capable of performing demosaicking (for example, a pattern 1310 or a pattern 1321).

For example, the electronic device (for example, the electronic device 101 of FIGS. 1 and 3) may cause the first raw image data outputted by the image sensor (for example, the image sensor 230 of FIG. 2, the image sensor 383 of FIG. 3) to have a second pattern 1310 corresponding to a Bayer pattern by performing Bayer merging to merge pixels of a 4×4 configuration including information regarding the same color channel in the first pattern 1300. In this case, the first raw image data having the pattern changed may have a resolution of 1/16 of the resolution before the pattern is changed. Accordingly, the electronic device (for example, the electronic device 101 of FIGS. 1 and 3) may upscale the first raw image data having the pattern changed 16 times.

Alternatively, for example, the electronic device (for example, the electronic device 101 of FIGS. 1 and 3) may cause the first raw image data outputted by the image sensor (for example, the image sensor 230 of FIG. 2, the image sensor 383 of FIG. 3) to have a third pattern 1321 corresponding to a tetra pattern by merging pixels of a 2×2 configuration including information regarding the same color channel in the first pattern 1300. The electronic device (for example, the electronic device 101 of FIGS. 1 and 3) may change an output of the image sensor (for example, the image sensor 230 of FIG. 2, the image sensor 383 of FIG. 3) to have a fourth pattern 1323 corresponding to a Bayer pattern by performing re-mosaicking with respect to the third pattern 1321. In this case, the first raw image data having the pattern changed may have a resolution of 1/4 of the resolution before the pattern is changed. Accordingly, the electronic device (for example, the electronic device 101 of FIGS. 1 and 3) may upscale the first raw image data having the pattern changed 4 times.

Figure 14:
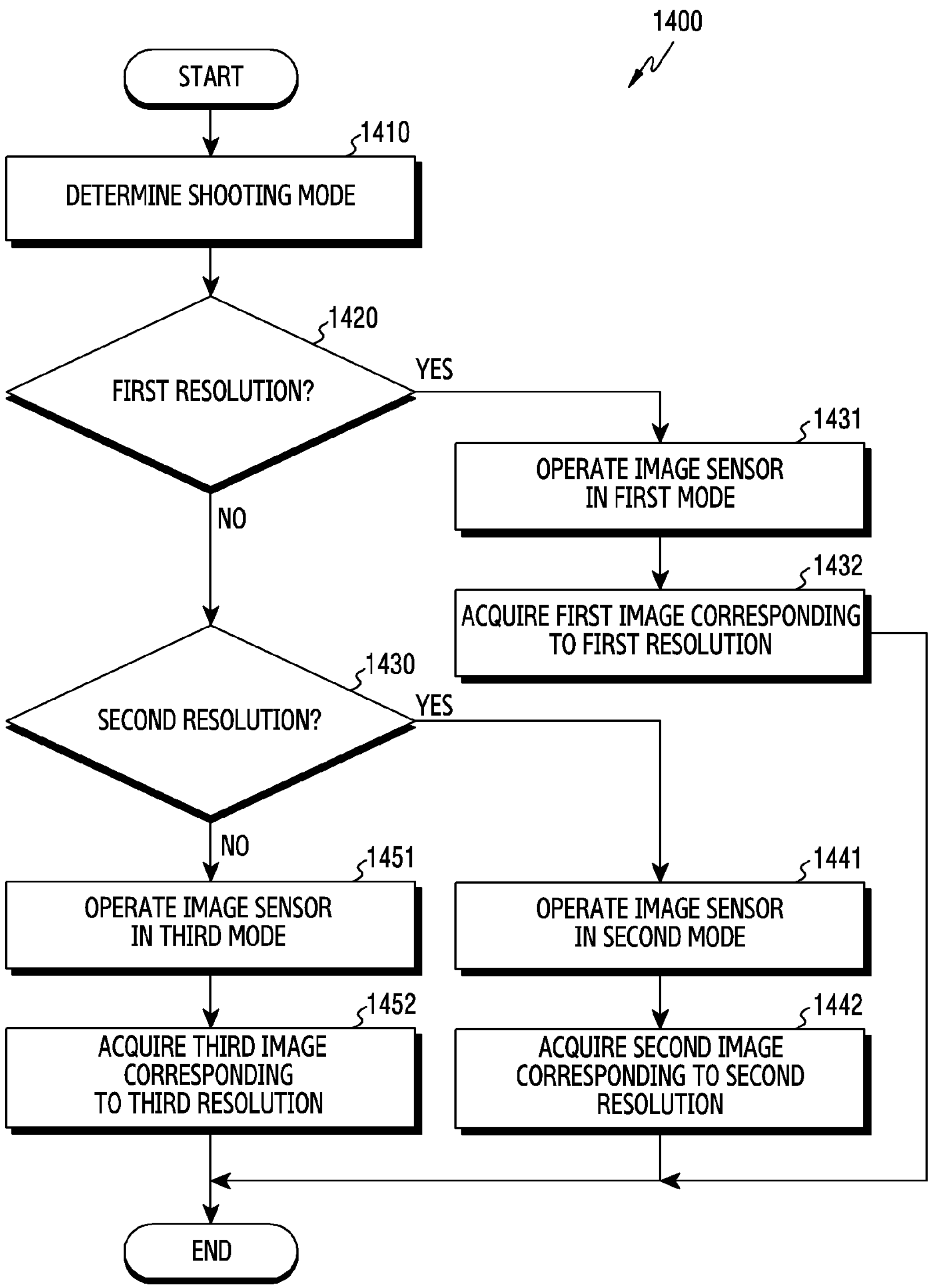
FIG. 14 illustrates a process of acquiring an image based on three modes related to operations of an image sensor by an electronic device according to an embodiment.

FIG. 14 is a flowchart 1400 illustrating operations of acquiring an image based on three modes related to operations of an image sensor (for example, the image sensor 230 of FIG. 2, the image sensor 383 of FIG. 3) by an electronic device (for example, the electronic device 101 of FIGS. 1 and 3) according to an embodiment.

In operation 1410, the electronic device (for example, the electronic device 101 of FIGS. 1 and 3) according to an embodiment may determine a shooting mode for shooting an image. For example, the electronic device (for example, the electronic device 101 of FIGS. 1 and 3) may receive a user input for selecting a shooting mode, and may determine a shooting mode based on the received user input. Alternatively, for example, the electronic device (for example, the electronic device 101 of FIGS. 1 and 3) may determine a shooting mode for shooting an image, based on default setting. Alternatively, for example, the electronic device (for example, the electronic device 101 of FIGS. 1 and 3) may determine a shooting mode for shooting an image based on a previously set shooting mode.

The electronic device (for example, the electronic device 101 of FIGS. 1 and 3) according to an embodiment may determine whether the determined shooting mode is a first shooting mode corresponding to a first resolution in operation 1420. The first resolution may be a highest resolution that can be provided through an image sensor (for example, the image sensor 230 of FIG. 2, the image sensor 383 of FIG. 3). However, this should not be considered as limiting. When the determined shooting mode is the first shooting mode, the electronic device (for example, the electronic device 101 of FIGS. 1 and 3) may control the image sensor (for example, the image sensor 230 of FIG. 2, the image sensor 383 of FIG. 3) to output first raw image data corresponding to the first resolution in operation 1431. Herein, the first raw image data may be a raw image of the first resolution that has a pattern not corresponding to a Bayer pattern.

In operation 1432, the electronic device (for example, the electronic device 101 of FIGS. 1 and 3) according to an embodiment may acquire a first image of the first resolution based on the first raw image data. In an embodiment, the electronic device (for example, the electronic device 101 of FIGS. 1 and 3) may acquire the first image based on a result of inputting the first raw image data to a prediction model which is a machine learning model. The electronic device (for example, the electronic device 101 of FIGS. 1 and 3) according to an embodiment may store the first image in a memory (for example, the memory 130 of FIG. 1, the memory 330 of FIG. 3), may transmit the first image to an external device, or may output the first image through a display (for example, the display 160 of FIG. 1, the display 360 of FIG. 3).

When the determined shooting mode is not the first shooting mode, the electronic device (for example, the electronic device 101 of FIGS. 1 and 3) according to an embodiment may determine whether the determined shooting mode is a second shooting mode in operation 1430. The second shooting mode may correspond to a second resolution which is lower than the first resolution. Although the flowchart 1400 illustrated in FIG. 14 illustrates operation 1420 and operation 1430, separately, this should not be considered as limiting. For example, operation 1420 and operation 1430 may be replaced with operation 1431 which is performed when the determined shooting mode is the first shooting mode, operation 1441 which is performed when the determined shooting mode is the second shooting mode, and operation 1451 which is performed when the determined shooting mode is a third shooting mode.

When the determined shooting mode is the second shooting mode, the electronic device (for example, the electronic device 101 of FIGS. 1 and 3) according to an embodiment may control the image sensor (for example, the image sensor 230 of FIG. 2, the image sensor 383 of FIG. 3) to output second raw image data corresponding to the second resolution in operation 1441. The second raw image data may include data that is configured to have a Bayer pattern through re-mosaicking computations.

In operation 1442, the electronic device (for example, the electronic device 101 of FIGS. 1 and 3) according to an embodiment may acquire a second image of the second resolution based on the second raw image data. In an embodiment, the electronic device (for example, the electronic device 101 of FIGS. 1 and 3) may acquire the second image by performing at least one image processing operation with respect to the second raw image data. The electronic device (for example, the electronic device 101 of FIGS. 1 and 3) according to an embodiment may store the second image in the memory (for example, the memory 130 of FIG. 1, the memory 330 of FIG. 3), may transmit the second image to an external device, or may output the second image through the display (for example, the display 160 of FIG. 1, the display 360 of FIG. 3).

When the determined shooting mode is the third shooting mode (or is not the first shooting mode and the second shooting mode), the electronic device (for example, the electronic device 101 of FIGS. 1 and 3) according to an embodiment may control the image sensor (for example, the image sensor 230 of FIG. 2, the image sensor 383 of FIG. 3) to output third raw image data corresponding to a third resolution in operation 1451. The third shooting mode may correspond to the third resolution which is lower than the second resolution. The third raw image data may include data that is configured to have a Bayer pattern by merging output values of light receiving elements analoguely and/or digitally.

In operation 1452, the electronic device (for example, the electronic device 101 of FIGS. 1 and 3) according to an embodiment may acquire a third image of the third resolution based on the third raw image data. In an embodiment, the electronic device (for example, the electronic device 101 of FIGS. 1 and 3) may acquire the third image by performing at least one image processing operation with respect to the third raw image data. The electronic device (for example, the electronic device 101 of FIGS. 1 and 3) according to an embodiment may store the third image in the memory (for example, the memory 130 of FIG. 1, the memory 330 of FIG. 3), may transmit the third image to an external device, or may output the third image through the display (for example, the display 160 of FIG. 1, the display 360 of FIG. 3).

As a degree of integration of light receiving elements included in an image sensor increases, a plurality of light receiving elements adjacent to one another may be arranged to correspond to a color channel of the same color within a color filter. The image sensor having such a structure may operate based on two or more modes. The image sensor may perform a binning or summing process so that data outputted by detecting from respective light receiving elements has a Bayer pattern. The image sensor may transform a pattern of outputted data to have a Bayer pattern. The image sensor may change a color order to transform a pattern, and may predict a value of the changed color. Changing a color order to transform a pattern and predicting a value of the changed color may be referred to as re-mosaicking.

However, in the case of a specific pattern (for example, a hexadeca pattern), it may be difficult to acquire an image from which an artifact is removed due to a result of performing re-mosaicking. In addition, a value of a modulation transfer function (MTF) should be guaranteed to acquire an image of high quality. However, in the case of a specific pattern, it may be difficult to guarantee an MTF value even when re-mosaicking is performed.

The technical objects to be achieved by the disclosure are not limited to those mentioned above, and other technical objects that are not mentioned above may be clearly understood to those skilled in the art based on the description of the disclosure.

In an embodiment, an electronic device (for example, the electronic device 101 of FIGS. 1 and 3) may include: a camera (for example, the camera 180 of FIG. 1, the camera 380 of FIG. 3) including a lens (for example, the lens 381 of FIG. 3) and an image sensor (for example, the image sensor 230 of FIG. 2, the image sensor 383 of FIG. 3) which is configured to convert an optical signal passing through the lens (for example, the lens 381 of FIG. 3) into a digital signal; a memory (for example, the memory 130 of FIG. 1, the memory 330 of FIG. 3) configured to store instructions; and at least one processor (for example, the processor 120 of FIG. 1, the image signal processor 260 of FIG. 2, the at least one processor 320 of FIG. 3). The image sensor (for example, the image sensor 230 of FIG. 2, the image sensor 383 of FIG. 3) may include a plurality of light receiving elements (for example, the light receiving panel 415 of FIG. 4), a plurality of micro lenses (for example, the micro lens array 411 of FIG. 4), and a color filter (for example, the color filter 413 of FIG. 4) including a plurality of color channels. The plurality of light receiving elements (for example, the light receiving panel 415 of FIG. 4) may include a plurality of photo diodes (for example, the first photo diode 511, the second photo diode 512, the third photo diode 513, the fourth photo diode 514 of FIG. 5) arranged in a M×N configuration to correspond to one first micro lens (for example, the first micro lens 521 of FIG. 5). At least one of M or N may be a natural number greater than or equal to 2. The instructions, being executed by the at least one processor (for example, the processor 120 of FIG. 1, the image signal processor 260 of FIG. 2, the at least one processor 320 of FIG. 3), may cause the electronic device (for example, the electronic device 101 of FIGS. 1 and 3) to determine a shooting mode corresponding to a resolution of an image to be shot by using the camera (for example, the camera 180 of FIG. 1, the camera 380 of FIG. 3). The instructions, being executed by the at least one processor (for example, the processor 120 of FIG. 1, the image signal processor 260 of FIG. 2, the at least one processor 320 of FIG. 3), may cause the electronic device (for example, the electronic device 101 of FIGS. 1 and 3) to control the image sensor (for example, the image sensor 230 of FIG. 2, the image sensor 383 of FIG. 3) to output first raw image data corresponding to first data which is read out such that an output of a first light receiving element corresponding to one photo diode among the plurality of photo diodes (for example, the first photo diode 511, the second photo diode 512, the third photo diode 513, the fourth photo diode 514 of FIG. 5) corresponds to one pixel, based on the determined shooting mode corresponding to a first resolution. The instructions, being executed by the at least one processor (for example, the processor 120 of FIG. 1, the image signal processor 260 of FIG. 2, the at least one processor 320 of FIG. 3), may cause the electronic device (for example, the electronic device 101 of FIGS. 1 and 3) to acquire a first image corresponding to the first resolution, based on a result of inputting the first raw image data to a machine learning model. The instructions, being executed by the at least one processor (for example, the processor 120 of FIG. 1, the image signal processor 260 of FIG. 2, the at least one processor 320 of FIG. 3), may cause the electronic device (for example, the electronic device 101 of FIGS. 1 and 3) to control the image sensor (for example, the image sensor 230 of FIG. 2, the image sensor 383 of FIG. 3) to output second raw image data acquired by performing at least one image processing operation with respect to second data which is read out such that outputs of second light receiving elements corresponding to at least two or more photo diodes among the plurality of photo diodes (for example, the first photo diode 511, the second photo diode 512, the third photo diode 513, the fourth photo diode 514 of FIG. 5) correspond to one pixel, based on the determined shooting mode corresponding to a second resolution which is lower than the first resolution. The instructions, being executed by the at least one processor (for example, the processor 120 of FIG. 1, the image signal processor 260 of FIG. 2, the at least one processor 320 of FIG. 3), may cause the electronic device (for example, the electronic device 101 of FIGS. 1 and 3) to acquire a second image corresponding to the second resolution by performing image signal processing with respect to the second raw image data.

In an embodiment, the first raw image data may include data in which a color order of the read-out data is maintained.

In an embodiment, the image sensor (for example, the image sensor 230 of FIG. 2, the image sensor 383 of FIG. 3) may be configured to output the second raw image data by performing re-mosaicking processing to change a color order of the second data to have a Bayer pattern.

In an embodiment, the image sensor (for example, the image sensor 230 of FIG. 2, the image sensor 383 of FIG. 3) may be configured to output the first raw image data by calibrating the first data based on at least one of a zoom magnification of the camera (for example, the camera 180 of FIG. 1, the camera 380 of FIG. 3) or a focus position of the lens (for example, the lens 381 of FIG. 3).

In an embodiment, the image sensor (for example, the image sensor 230 of FIG. 2, the image sensor 383 of FIG. 3) may be configured to calibrate the first data by compensating a split ratio of light to the four photo diodes (for example, the first photo diode 511, the second photo diode 512, the third photo diode 513, the fourth photo diode 514 of FIG. 5).

In an embodiment, the electronic device (for example, the electronic device 101 of FIGS. 1 and 3) may further include a display (for example, the display 160 of FIG. 1, the display 360 of FIG. 3). The instructions, being executed by the at least one processor (for example, the processor 120 of FIG. 1, the image signal processor 260 of FIG. 2, the at least one processor 320 of FIG. 3), may cause the electronic device (for example, the electronic device 101 of FIGS. 1 and 3) to execute a camera application for shooting an image by using the camera (for example, the camera 180 of FIG. 1, the camera 380 of FIG. 3). The instructions, being executed by the at least one processor (for example, the processor 120 of FIG. 1, the image signal processor 260 of FIG. 2, the at least one processor 320 of FIG. 3), may cause the electronic device (for example, the electronic device 101 of FIGS. 1 and 3) to display a screen including a user interface for selecting the resolution through the display (for example, the display 160 of FIG. 1, the display 360 of FIG. 3), based on the executed camera application. The instructions, being executed by the at least one processor (for example, the processor 120 of FIG. 1, the image signal processor 260 of FIG. 2, the at least one processor 320 of FIG. 3), may cause the electronic device (for example, the electronic device 101 of FIGS. 1 and 3) to control the image sensor (for example, the image sensor 230 of FIG. 2, the image sensor 383 of FIG. 3) based on a shooting mode which is determined based on a user input received based on the user interface.

In an embodiment, the plurality of micro lenses of the image sensor (for example, the image sensor 230 of FIG. 2, the image sensor 383 of FIG. 3) may be arranged such that four second micro lenses (for example, the first micro lens 521, the second micro lens 522, the third micro lens 523, and the fourth micro lens 524 of FIG. 5) including the first micro lens (for example, the first micro lens 521 of FIG. 5) correspond to one color channel (for example, the green channel 531 of FIG. 5) within the color filter. One pixel included in the second raw image data may correspond to outputs of the four photo diodes (for example, the first photo diode 511, the second photo diode 512, the third photo diode 513, the fourth photo diode 514 of FIG. 5). The instructions, being executed by the at least one processor (for example, the processor 120 of FIG. 1, the image signal processor 260 of FIG. 2, the at least one processor 320 of FIG. 3), may cause the electronic device (for example, the electronic device 101 of FIGS. 1 and 3) to control the image sensor (for example, the image sensor 230 of FIG. 2, the image sensor 383 of FIG. 3) to output third raw image data by performing at least one image processing operation with respect to third data which is read out such that outputs of third light receiving elements corresponding to photo diodes arranged to correspond to the one color channel (for example, the green channel 531 of FIG. 5) among the plurality of light receiving elements (for example, the light receiving panel 415 of FIG. 4) correspond to one pixel, based on the determined shooting mode corresponding to a third resolution which is lower than the second resolution. The instructions, being executed by the at least one processor (for example, the processor 120 of FIG. 1, the image signal processor 260 of FIG. 2, the at least one processor 320 of FIG. 3), may cause the electronic device (for example, the electronic device 101 of FIGS. 1 and 3) to acquire a third image corresponding to the third resolution by performing image signal processing with respect to the third raw image data.

In an embodiment, The instructions, being executed by the at least one processor (for example, the processor 120 of FIG. 1, the image signal processor 260 of FIG. 2, the at least one processor 320 of FIG. 3), may cause the electronic device (for example, the electronic device 101 of FIGS. 1 and 3) to acquire information regarding a context related to the image shooting while the determined shooting mode corresponds to the first resolution. The instructions, being executed by the at least one processor (for example, the processor 120 of FIG. 1, the image signal processor 260 of FIG. 2, the at least one processor 320 of FIG. 3), may cause the electronic device (for example, the electronic device 101 of FIGS. 1 and 3) to output the first image by performing image signal processing with respect to the first raw image data, based on the information regarding the context corresponding to a designated context. The instructions, being executed by the at least one processor (for example, the processor 120 of FIG. 1, the image signal processor 260 of FIG. 2, the at least one processor 320 of FIG. 3), may cause the electronic device (for example, the electronic device 101 of FIGS. 1 and 3) to acquire the first image corresponding to the first resolution based on a result of inputting the first raw image data to a machine learning model, based on the information regarding the context not corresponding to the designated context.

In an embodiment, the designated context may include at least one of a first context in which illuminance is less than a threshold value, a second context in which a shot image is defocused, or a third context in which a high frequency component included in an image is less than a threshold value. The image signal processing for the first raw image data may include a binning processing process for pixels of the first raw image data or a re-mosaicking process of transforming a pattern of the first raw image data into a Bayer pattern and an upscaling process of magnifying an image.

According to an embodiment, a method for operating an electronic device (for example, the electronic device 101 of FIGS. 1 and 3) including a camera (for example, the camera 180 of FIG. 1, the camera 380 of FIG. 3) including an image sensor (for example, the image sensor 230 of FIG. 2, the image sensor 383 of FIG. 3) may include determining a shooting mode corresponding to a resolution of an image to be shot by using the camera (for example, the camera 180 of FIG. 1, the camera 380 of FIG. 3). The method may include controlling the image sensor (for example, the image sensor 230 of FIG. 2, the image sensor 383 of FIG. 3) to output first raw image data corresponding to first data which is read out such that an output of a first light receiving element corresponding to one photo diode among the plurality of photo diodes (for example, the first photo diode 511, the second photo diode 512, the third photo diode 513, the fourth photo diode 514) of the image sensor (for example, the image sensor 230 of FIG. 2, the image sensor 383 of FIG. 3) corresponds to one pixel, based on the determined shooting mode corresponding to a first resolution. The method may include acquiring a first image corresponding to the first resolution, based on a result of inputting the first raw image data to a machine learning model. The method may include outputting second raw image data acquired by performing at least one image processing operation with respect to second data which is read out such that outputs of second light receiving elements corresponding to at least two or more photo diodes among the plurality of photo diodes (for example, the first photo diode 511, the second photo diode 512, the third photo diode 513, the fourth photo diode 514) correspond to one pixel, based on the determined shooting mode corresponding to a second resolution which is lower than the first resolution. The method may include acquiring a second image corresponding to the second resolution by performing image signal processing with respect to the second raw image data. The image sensor (for example, the image sensor 230 of FIG. 2, the image sensor 383 of FIG. 3) may include a plurality of light receiving elements including a plurality of photo diodes (for example, the first photo diode 511, the second photo diode 512, the third photo diode 513, the fourth photo diode 514) arranged in a M×N configuration to correspond to one first micro lens (for example, the first micro lens 521). At least one of M or N may be a natural number greater than or equal to 2.

In an embodiment, the first raw image data may include data in which a color order of the read-out data is maintained.

In an embodiment, outputting the second raw image data may include acquiring, by the image sensor (for example, the image sensor 230 of FIG. 2, the image sensor 383 of FIG.

3), the second raw image data by performing re-mosaicking processing to change a color order of the second data to have a Bayer pattern.

In an embodiment, outputting the first raw image data may include calibrating, by the image sensor (for example, the image sensor 230 of FIG. 2, the image sensor 383 of FIG. 3), the first data based on at least one of a zoom magnification of the camera (for example, the camera 180 of FIG. 1, the camera 380 of FIG. 3) or a focus position of a lens (for example, the lens 381 of FIG. 3) of the camera (for example, the camera 180 of FIG. 1, the camera 380 of FIG. 3).

In an embodiment, calibrating the first data may include compensating a split ratio of light to the plurality of photo diodes (for example, the first photo diode 511, the second photo diode 512, the third photo diode 513, and the fourth photo diode 514).

In an embodiment, determining the shooting mode may include executing a camera application for shooting an image by using the camera (for example, the camera 180 of FIG. 1, the camera 380 of FIG. 3). Determining the shooting mode may include displaying a screen including a user interface for selecting the resolution, based on the executed camera application. Determining the shooting mode may include determining a shooting mode based on a user input received based on the user interface.

In an embodiment, one pixel included in the second raw image data may correspond to outputs of the four photo diodes (for example, the first photo diode 511, the second photo diode 512, the third photo diode 513, the fourth photo diode 514 of FIG. 5). The method may further include outputting third raw image data based on third data which is read out such that outputs of third light receiving elements corresponding to a plurality of photo diodes arranged to correspond to one color channel (for example, the green channel 531 of FIG. 5) included in a color filter of the image sensor correspond to one pixel, based on the determined shooting mode corresponding to a third resolution which is lower than the second resolution. The method may include acquiring a third image corresponding to the third resolution by performing image signal processing with respect to the third raw image data.

In an embodiment, acquiring the first image may include acquiring information regarding a context related to the image shooting while the determined shooting mode corresponds to the first resolution. Acquiring the first image may include acquiring the first image by performing image signal processing with respect to the first raw image data, based on the information regarding the context corresponding to a designated context. Acquiring the first image may include acquiring the first image corresponding to the first resolution based on a result of inputting the first raw image data to a machine learning model, based on the information regarding the context not corresponding to the designated context.

In an embodiment, the designated context may include at least one of a first context in which illuminance is less than a threshold value, a second context in which a shot image is defocused, or a third context in which a high frequency component included in an image is less than a threshold value. The image signal processing for the first raw image data may include a binning processing process for pixels of the first raw image data or a re-mosaicking process of transforming a pattern of the first raw image data into a Bayer pattern and an upscaling process of magnifying an image.

According to an embodiment, an image sensor (for example, the image sensor 230 of FIG. 2, the image sensor 383 of FIG. 3) may include: a plurality of light receiving elements (for example, the light receiving panel 415 of FIG. 4); a plurality of micro lenses; and a color filter including a plurality of color channels. The plurality of light receiving elements (for example, the light receiving panel 415 of FIG. 4) may include a plurality of photo diodes (for example, the first photo diode 511, the second photo diode 512, the third photo diode 513, the fourth photo diode 514) arranged in a M×N configuration to correspond to one first micro lens (for example, the first micro lens 521 of FIG. 5). At least one of M or N may be a natural number greater than or equal to 2. The image sensor (for example, the image sensor 230 of FIG. 2, the image sensor 383 of FIG. 3) may be configured to, while operating based on a first shooting mode corresponding to a first resolution, output first raw image data corresponding to first data which is read out such that an output of a first light receiving element corresponding to one photo diode among the plurality of photo diodes (for example, the first photo diode 511, the second photo diode 512, the third photo diode 513, the fourth photo diode 514) corresponds to one pixel. The image sensor (for example, the image sensor 230 of FIG. 2, the image sensor 383 of FIG. 3) may be configured to, while operating based on a second shooting mode corresponding to a second resolution which is lower than the first resolution, output second raw image data acquired by performing at least one image processing operation with respect to second data which is read out such that outputs of second light receiving elements corresponding to at least two or more photo diodes among the plurality of photo diodes (for example, the first photo diode 511, the second photo diode 512, the third photo diode 513, the fourth photo diode 514) correspond to one pixel.

In an embodiment, the first raw image data may include data in which a color order of the read-out data is maintained.

In an embodiment, a computer-readable non-transitory recording medium may have a computer program recorded thereon to perform the above-described method when an electronic device (for example, the electronic device 101 of FIGS. 1 and 3) executes the method.

According to one or more embodiments, there is provided an electronic device which may acquire an image without an artifact while an image sensor is operating based on an operation mode for acquiring an image of a larger number of pixels, and/or an operating method thereof.

According to one or more embodiments, there is provided an electronic device which may obtain a high MTF value while an image sensor is operating in an operation mode for acquiring an image of a larger number of pixels, and/or an operating method thereof.

The effects achieved by the disclosure are not limited to those mentioned above, and other effects that are not mentioned above may be clearly understood to those skilled in the art based on the description provided below.

Methods based on the claims or the embodiments disclosed in the disclosure may be implemented in hardware, software, or a combination of both.

When implemented in software, a computer readable storage medium for storing one or more programs (software modules) may be provided. The one or more programs stored in the computer readable storage medium are configured for execution performed by one or more processors in an electronic device. The one or more programs include instructions for allowing the electronic device to execute the methods based on the claims or the embodiments disclosed in the disclosure.

The program (the software module or software) may be stored in a random access memory, a non-volatile memory including a flash memory, a read only memory (ROM), an electrically erasable programmable read only memory (EEPROM), a magnetic disc storage device, a compact disc-ROM (CD-ROM), digital versatile discs (DVDs) or other forms of optical storage devices, and a magnetic cassette. Alternatively, the program may be stored in a memory configured in combination of all or some of these storage media. In addition, the configured memory may be plural in number.

Further, the program may be stored in an attachable storage device capable of accessing the electronic device through a communication network such as the Internet, an Intranet, a local area network (LAN), a wide LAN (WLAN), or a storage area network (SAN) or a communication network configured by combining the networks. The storage device may access via an external port to a device which performs the embodiments of the disclosure. In addition, an additional storage device on a communication network may access to a device which performs the embodiments of the disclosure.

In the above-described specific embodiments of the disclosure, elements included in the disclosure are expressed in singular or plural forms according to specific embodiments. However, singular or plural forms are appropriately selected according to presented situations for convenience of explanation, and the disclosure is not limited to a single element or plural elements. An element which is expressed in a plural form may be configured in a singular form or an element which is expressed in a singular form may be configured in plural number.

The term "unit" or "module" used in the disclosure refer to a hardware component such as a processor or a circuit, and/or a software component executed by a hardware component such as a processor.

A "unit", "module" may be implemented by a program that is stored in a storage medium which may be addressed, and is executed by a processor. For example, a "unit", "module" may be implemented by components such as software components, object-oriented software components, class components, and task components, processes, functions, attributes, procedures, sub-routines, segments of a program code, drivers, firmware, a micro code, a circuit, data, a database, data structures, tables, arrays and parameters.

Specific execution explained in the disclosure is merely an example, and the scope of the disclosure is not limited by any method. For the sake of clarity of the specification, descriptions of related-art electronic components, control systems, software, and other functional aspects of the systems are omitted.

In the disclosure, such phrase as "including at least one of a, b, or c" may refer to "including only a", "including only b", "including only c", "including a and b", "including b and c, "including a and c", "including all of a, b, c".

While specific embodiments have been described in the detailed descriptions of the disclosure, it will be understood by those skilled in the art that various changes in form and details may be made therein without departing from the spirit and scope of the disclosure. Therefore, the scope of the disclosure is defined not by explained embodiments but by the appended claims and equivalents to the claims.

What is claimed is:

1. An electronic device comprising:
- a camera comprising a lens and an image sensor configured to convert an optical signal passing through the lens into a digital signal;
- a memory configured to store instructions; and
- at least one processor,
- wherein the image sensor comprises:
  - a plurality of micro lenses including a first micro lens,
  - a plurality of light receiving elements corresponding to a plurality of photo diodes arranged in a MXN configuration corresponding to the first micro lens, at least one of M or N being a natural number greater than or equal to 2, and
  - a color filter comprising a plurality of color channels, and
- wherein the instructions, being executed by the at least one processor, cause the electronic device to:
  - determine a shooting mode related to a resolution of an image to be shot by using the camera;
  - output, by controlling the image sensor, a first raw image data corresponding to a first data which is read out from the plurality of photo diodes, wherein one pixel of the first raw image data is obtained from an output of one of the plurality of photo diodes, based on the determined shooting mode corresponding to a first resolution;
  - acquire a first image corresponding to the first resolution, based on a result of inputting the first raw image data to a machine learning model;
  - output, by controlling the image sensor, a second raw image data acquired by performing at least one image processing operation with respect to a second data which is read out from the plurality of photo diodes, wherein one pixel of the second raw image data is obtained from outputs of two or more of the plurality of photo diodes, based on the determined shooting mode corresponding to a second resolution which is lower than the first resolution; and
  - acquire a second image corresponding to the second resolution by performing image signal processing with respect to the second raw image data.

2. The electronic device of claim 1, wherein the first raw image data comprises data in which a color order of the first data is maintained.

3. The electronic device of claim 2, wherein the image sensor is further configured to output the second raw image data by performing a re-mosaicking processing to change a color order of the second data to include a Bayer pattern.

4. The electronic device of claim 2, wherein the image sensor is further configured to output the first raw image data by calibrating the first data based on at least one of a zoom magnification of the camera or a focus position of the lens.

5. The electronic device of claim 4, wherein the image sensor is further configured to calibrate the first data by compensating a split ratio of light to the plurality of photo diodes.

6. The electronic device of claim 1, further comprising a display,
- wherein the instructions, being executed by the at least one processor, further cause the electronic device to:
- execute a camera application;
- display, based on the executed camera application, a user interface for selecting a resolution through the display; and
- control the image sensor based on a shooting mode determined based on a user input received through the user interface.

7. The electronic device of claim 1, wherein the plurality of micro lenses of the image sensor are arranged such that four second micro lenses comprising the first micro lens correspond to one color channel of the plurality of color channels within the color filter, wherein the plurality of photo diodes further includes a set of third photo diodes arranged to the one color channel, and wherein the instructions, being executed by the at least one processor, further cause the electronic device to:

output, by controlling the image sensor, third raw image data by performing at least one image processing operation with respect to third data which is read out from the set of third photo diodes, wherein outputs of the set of third photo diodes corresponds to one pixel, based on the determined shooting mode corresponding to a third resolution which is lower than the second resolution; and acquire a third image corresponding to the third resolution by performing image signal processing with respect to the third raw image data.

8. The electronic device of claim 1, wherein the instructions, being executed by the at least one processor, further cause the electronic device to:

acquire information regarding a context related to the image shooting in a case that the determined shooting mode corresponds to the first resolution;

output the first image by performing image signal processing with respect to the first raw image data, based on the information regarding the context corresponding to a designated context; and acquire the first image corresponding to the first resolution based on a result of inputting the first raw image data to the machine learning model, based on the information regarding the context not corresponding to the designated context.

9. The electronic device of claim 8, wherein the designated context comprises at least one of a first context in which illuminance is less than a first threshold value, a second context in which a shot image is defocused, or a third context in which a high frequency component included in the image is less than a second threshold value, and wherein the image signal processing for the first raw image data comprises a binning processing process for pixels of the first raw image data or a re-mosaicking process of transforming a pattern of the first raw image data into a Bayer pattern and an upscaling process of magnifying the image.

10. A method performed by an electronic device comprising a camera comprising an image sensor, wherein the image sensor comprises a plurality of photo diodes arranged in a MXN configuration corresponding to one first micro lens, at least one of M or N being a natural number greater than or equal to 2, the method comprising:

determining a shooting mode related to a resolution of an image to be shot by using the camera;

outputting, by controlling the image sensor, first raw image data corresponding to first data which is read out from the plurality of photo diodes, wherein one pixel of the first raw image data is obtained from an output of one of the plurality of photo diodes, based on the determined shooting mode corresponding to a first resolution;

acquiring a first image corresponding to the first resolution, based on a result of inputting the first raw image data to a machine learning;

outputting second raw image data acquired by performing at least one image processing operation with respect to second data which is read out from the plurality of photo diodes, wherein one pixel of the second raw image data is obtained from outputs of two or more of the plurality of photo diodes, based on the determined shooting mode corresponding to a second resolution which is lower than the first resolution; and acquiring a second image corresponding to the second resolution by performing image signal processing with respect to the second raw image data.

11. The method of claim 10, wherein the first raw image data comprises data in which a color order of the first data is maintained.

12. The method of claim 11, wherein the outputting the second raw image data comprises acquiring, by the image sensor, the second raw image data by performing a re-mosaicking processing to change a color order of the second data to include a Bayer pattern.

13. The method of claim 11, wherein the outputting the first raw image data comprises calibrating, by the image sensor, the first data based on at least one of a zoom magnification of the camera or a focus position.

14. The method of claim 13, wherein the calibrating the first data comprises compensating a split ratio of light to the plurality of photo diodes.

15. The method of claim 10, wherein the determining the shooting mode comprises:

executing a camera application;

displaying, based on the executed camera application, a user interface for selecting the resolution; and determining a shooting mode based on a user input received through the user interface.

16. The method of claim 10, further comprising:

outputting third raw image data based on third data which is read out from a set of third photo diodes of the plurality of photo diodes, wherein outputs of the set of third photo diodes being arranged to correspond to one color channel included in a color filter of the image sensor correspond to one pixel, based on the determined shooting mode corresponding to a third resolution which is lower than the second resolution; and acquiring a third image corresponding to the third resolution by performing image signal processing with respect to the third raw image data.

17. The method of claim 10, wherein the acquiring the first image comprises:

acquiring information regarding a context related to the image shooting in a case that the determined shooting mode corresponds to the first resolution;

acquiring the first image by performing image signal processing with respect to the first raw image data, based on the information regarding the context corresponding to a designated context; and acquiring the first image corresponding to the first resolution based on a result of inputting the first raw image data to a machine learning model, based on the information regarding the context not corresponding to the designated context.

18. The method of claim 17, wherein the designated context comprises at least one of a first context in which illuminance is less than a first threshold value, a second context in which a shot image is defocused, or a third context in which a high frequency component included in the image is less than a second threshold value, and wherein the image signal processing for the first raw image data comprises a binning processing process for pixels of the first raw image data or a re-mosaicking process of transforming a pattern of the first raw image data into a Bayer pattern and an upscaling process of magnifying the image.

19. An image sensor comprising:

a plurality of light receiving elements;

a plurality of micro lenses comprising a first micro lens; and a color filter comprising a plurality of color channels, wherein the plurality of light receiving elements correspond to a plurality of photo diodes arranged in a MXN configuration corresponding to the first micro lens, at least one of M or N being a natural number greater than or equal to 2, wherein the image sensor is configured to:

based on a first shooting mode corresponding to a first resolution, output first raw image data corresponding to first data which is read out from the plurality of photo diodes, wherein one pixel of the first raw image data is obtained from an output of one of the plurality of photo diodes; and based on a second shooting mode corresponding to a second resolution which is lower than the first resolution, output second raw image data acquired by performing at least one image processing operation with respect to second data which is read out from the plurality of photo diodes, wherein one pixel of the second raw image data is obtained from outputs of two or more of the plurality of photo diodes.

20. The image sensor of claim 19, wherein the first raw image data comprises data in which a color order of the first data is maintained.

* * * * *